United States Patent [19]

Davis et al.

[11] 4,028,847
[45] June 14, 1977

[54] APPARATUS FOR PRODUCING PLANTS

[75] Inventors: Noel Davis, Wayzata; William M. Dreier; Stanley C. Rustad, both of Golden Valley, all of Minn.

[73] Assignee: General Mills, Inc., Minneapolis, Minn.

[22] Filed: Feb. 19, 1976

[21] Appl. No.: 659,311

[52] U.S. Cl. .................................. 47/65; 47/86;
47/17; 165/59; 193/35 MD; 214/38 BB
[51] Int. Cl.² ...................................... A01G 31/02
[58] Field of Search ............ 47/1.2, 17, 18, DIG. 6,
47/16, 58, 65, 86, 59; 214/38 BB, 38 D;
104/48; 193/35 MD; 165/59, 60

[56] References Cited
UNITED STATES PATENTS

| | | | |
|---|---|---|---|
| 1,121,722 | 12/1914 | Fessenden | 47/1.2 X |
| 1,753,980 | 4/1903 | Baumgartner | 47/17 |
| 2,358,000 | 9/1944 | Cornell | 47/1.2 X |
| 3,324,593 | 6/1967 | Strasser | 47/1.2 X |
| 3,432,965 | 3/1969 | Smith et al. | 47/1.2 |
| 3,579,907 | 5/1971 | Graves | 47/1.2 X |
| 3,717,953 | 2/1973 | Kuhn et al. | 47/17 X |
| 3,766,684 | 10/1973 | Kato | 47/1.2 |
| 3,771,258 | 11/1973 | Charney | 47/1.2 |
| 3,824,736 | 7/1974 | Davis | 47/17 |
| 3,913,758 | 10/1975 | Faircloth et al. | 47/17 X |
| 3,927,491 | 12/1975 | Farnsworth | 47/1.2 |

FOREIGN PATENTS OR APPLICATIONS

| | | | |
|---|---|---|---|
| 8,589 | 8/1932 | Australia | 47/17 |
| 257,250 | 9/1967 | Austria | 47/1.2 |
| 932,961 | 9/1973 | Canada | 47/17 |
| 1,472,285 | 3/1967 | France | 47/1.2 |
| 2,037,013 | 2/1972 | Germany | 47/1.2 |
| 465,305 | 12/1968 | Switzerland | 47/1.2 |
| 922,293 | 3/1963 | United Kingdom | 47/17 |
| 468,056 | 9/1934 | United Kingdom | 47/16 |

*Primary Examiner*—E. H. Eickholt
*Attorney, Agent, or Firm*—G. O. Enockson; L. M. Lillehaugen

[57] ABSTRACT

An installation for continuously growing plants which includes one or more growth chambers wherein alternate periods of lightness and darkness are provided, and the environmental conditions are controlled. The plants are individually supported, and transported through the growth chambers in such a manner as to require a minimum amount of handling. A diverging track system is provided in one of the growth chambers for handling the plants in a prescribed manner and guiding them through the chamber. As the plants are moved through such chamber, increased space is automatically provided for plant growth. The installation is well suited for growing plants hydroponically.

30 Claims, 24 Drawing Figures

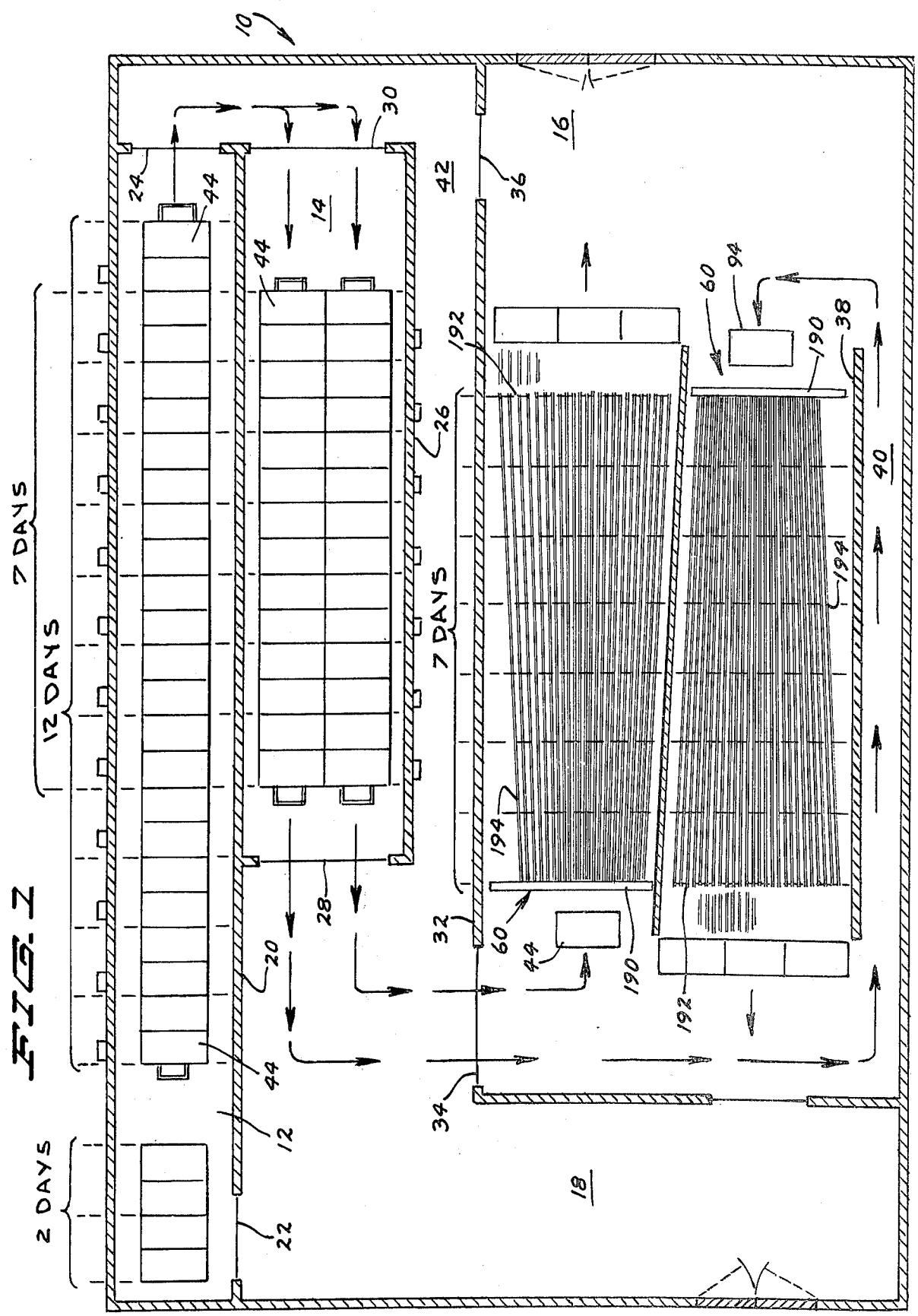

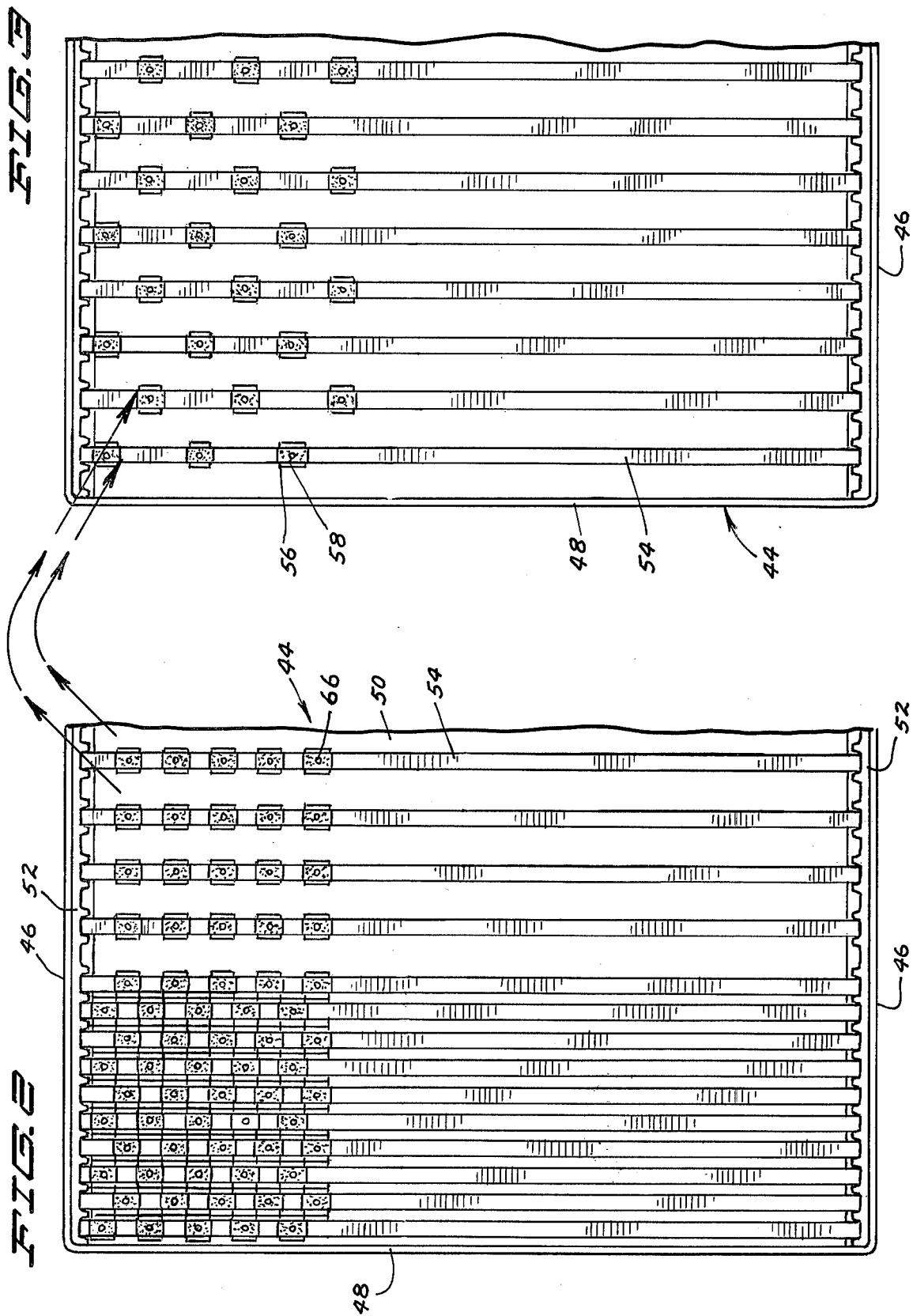

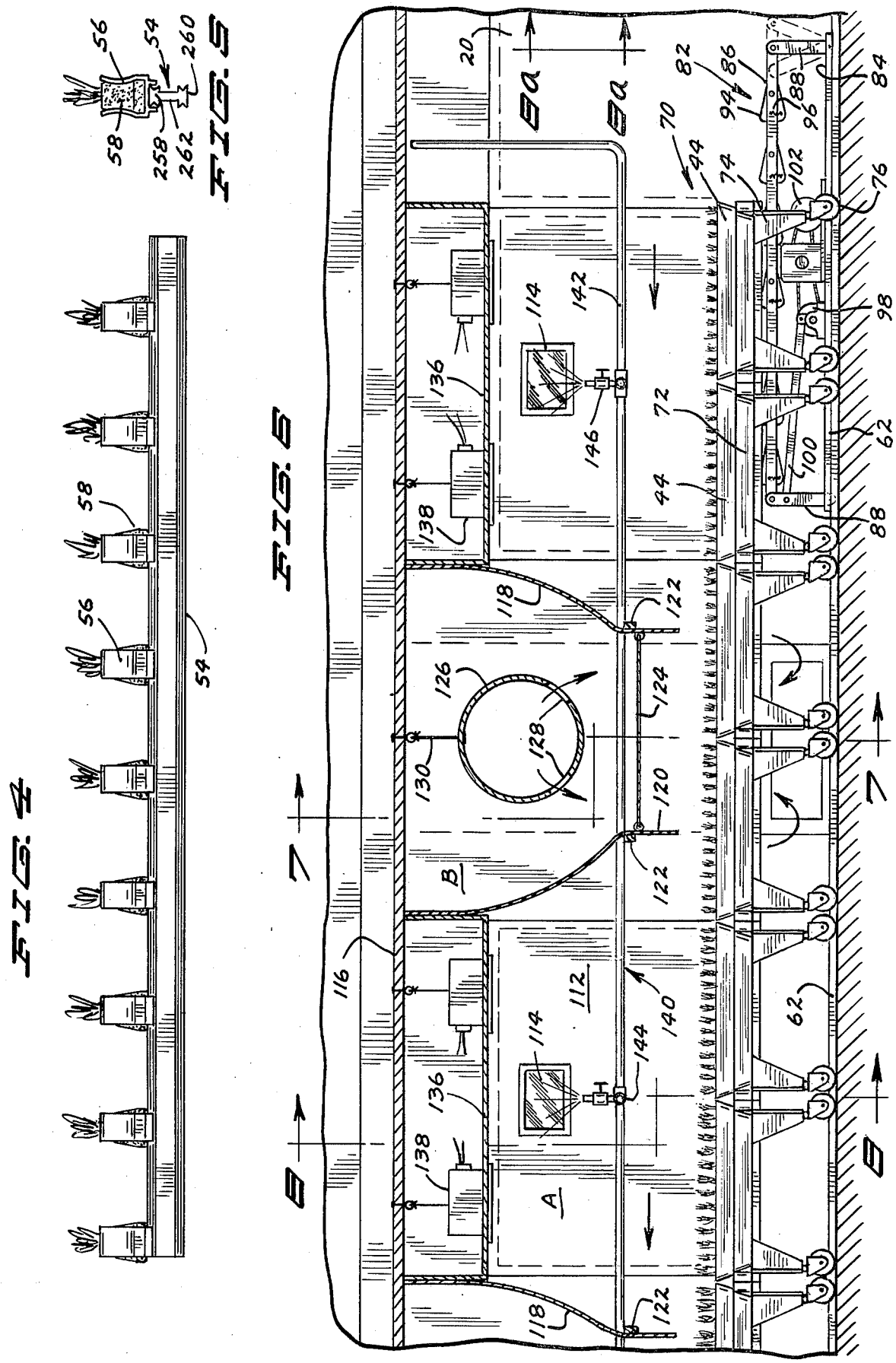

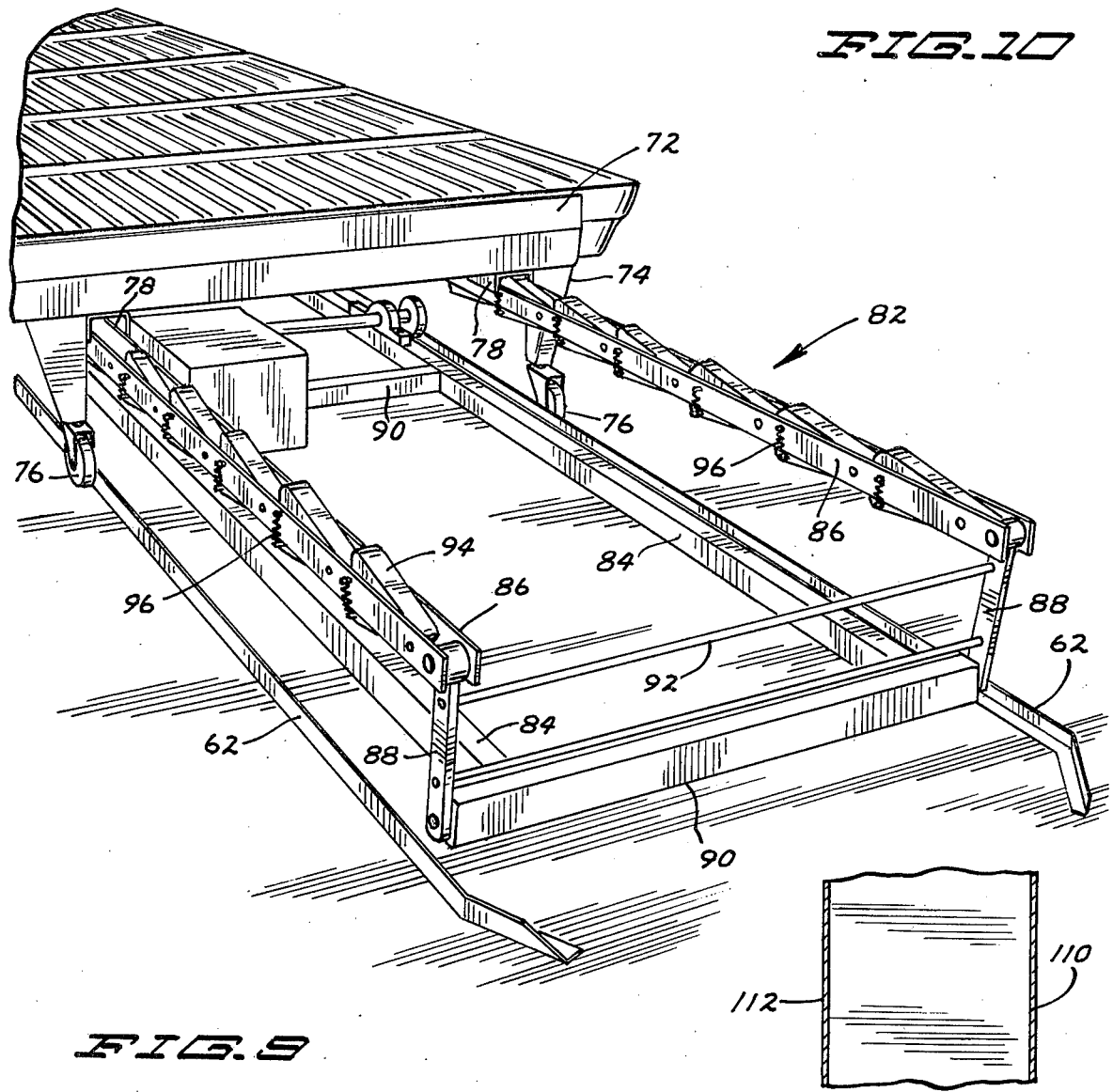
FIG.10
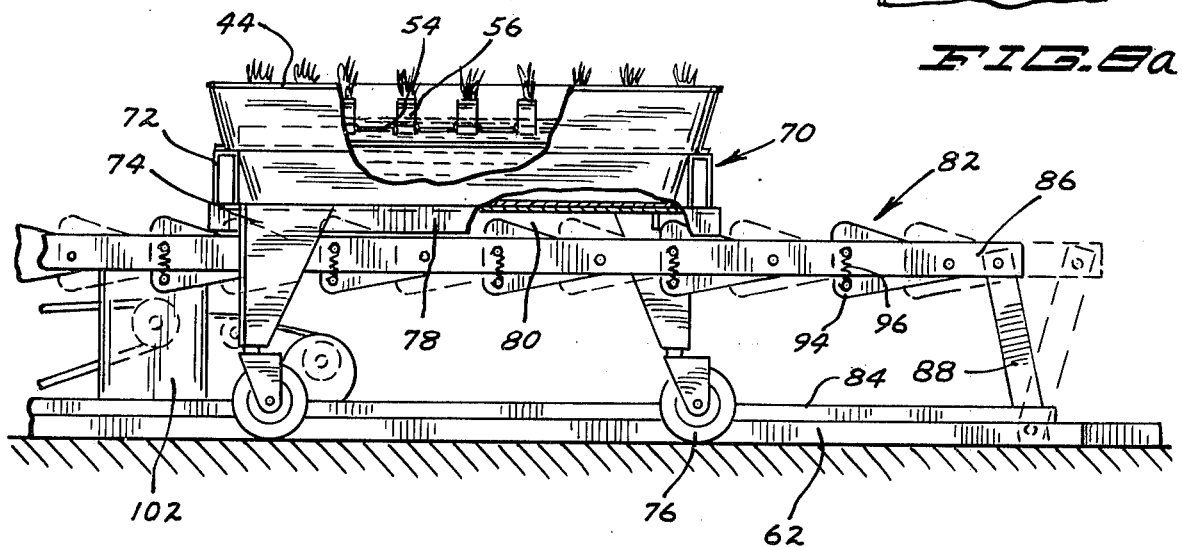
FIG.9
FIG.8a

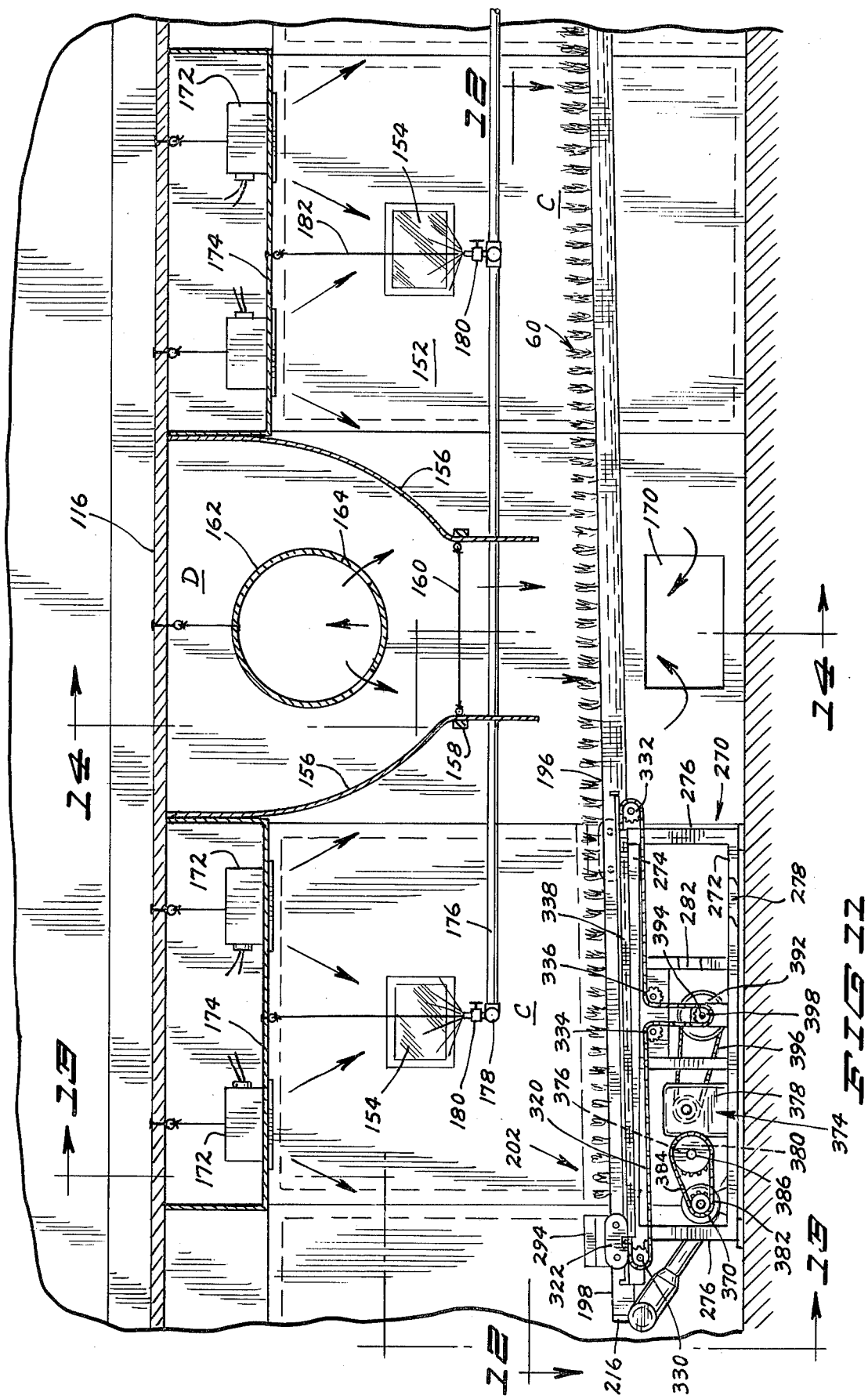

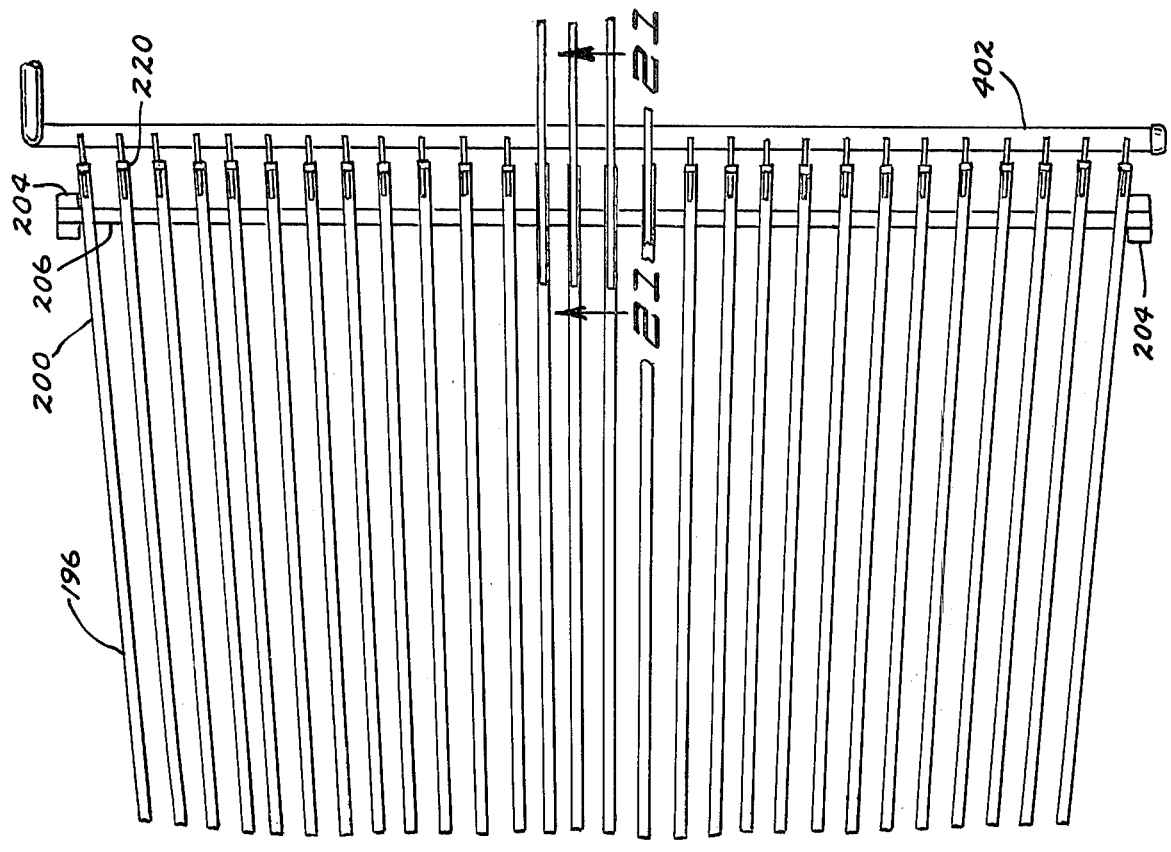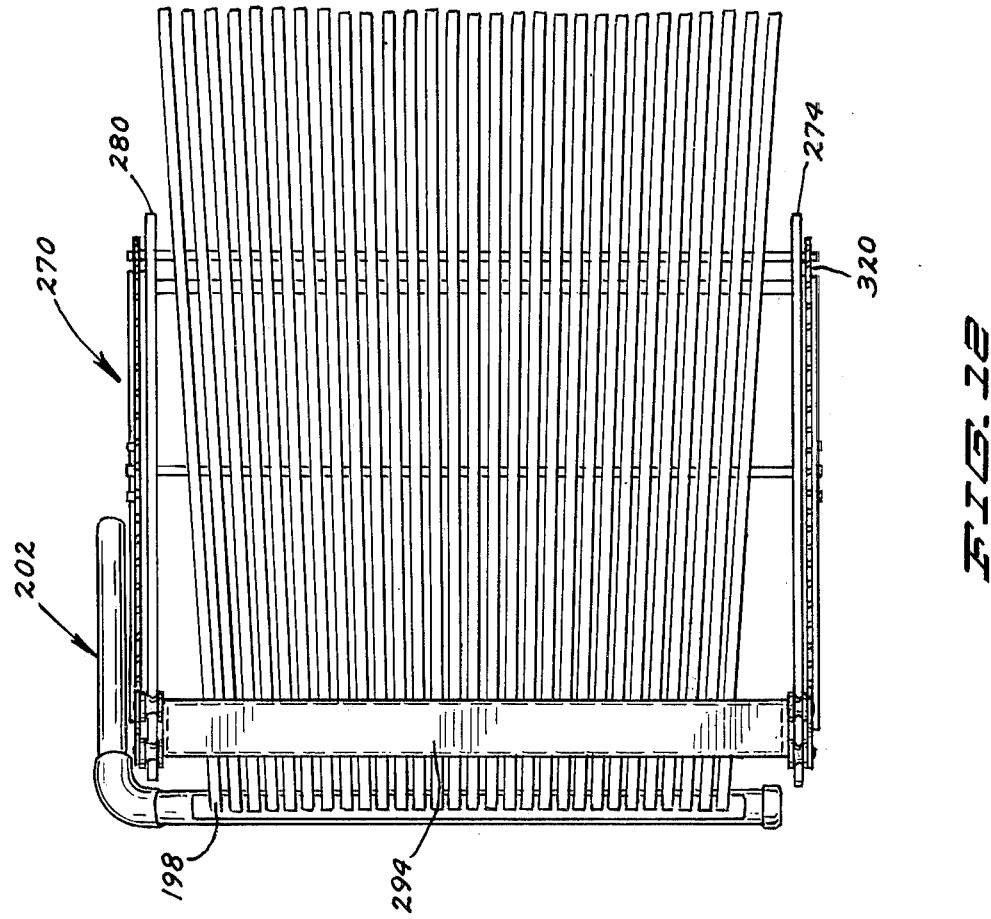
FIG. 12

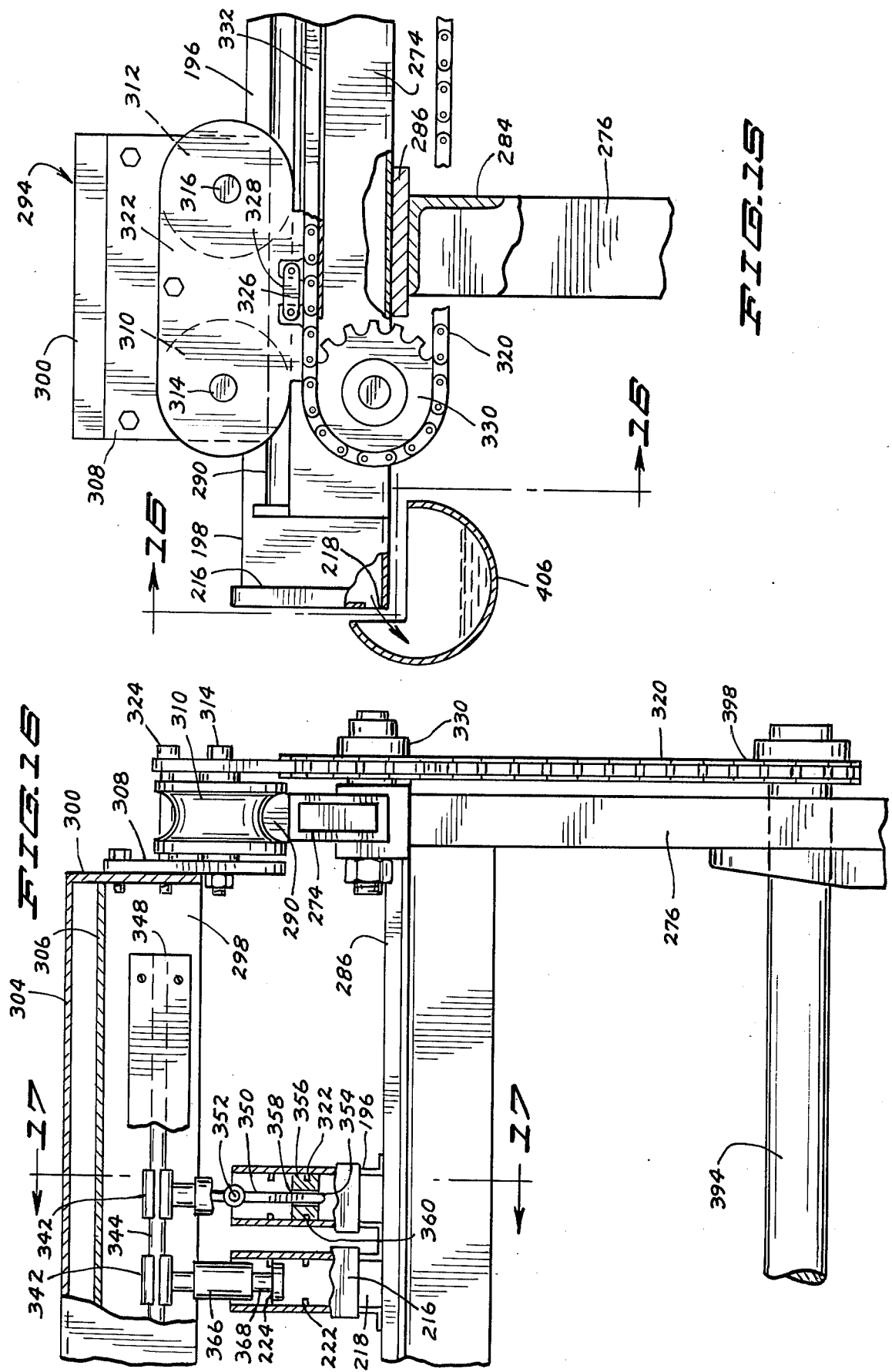

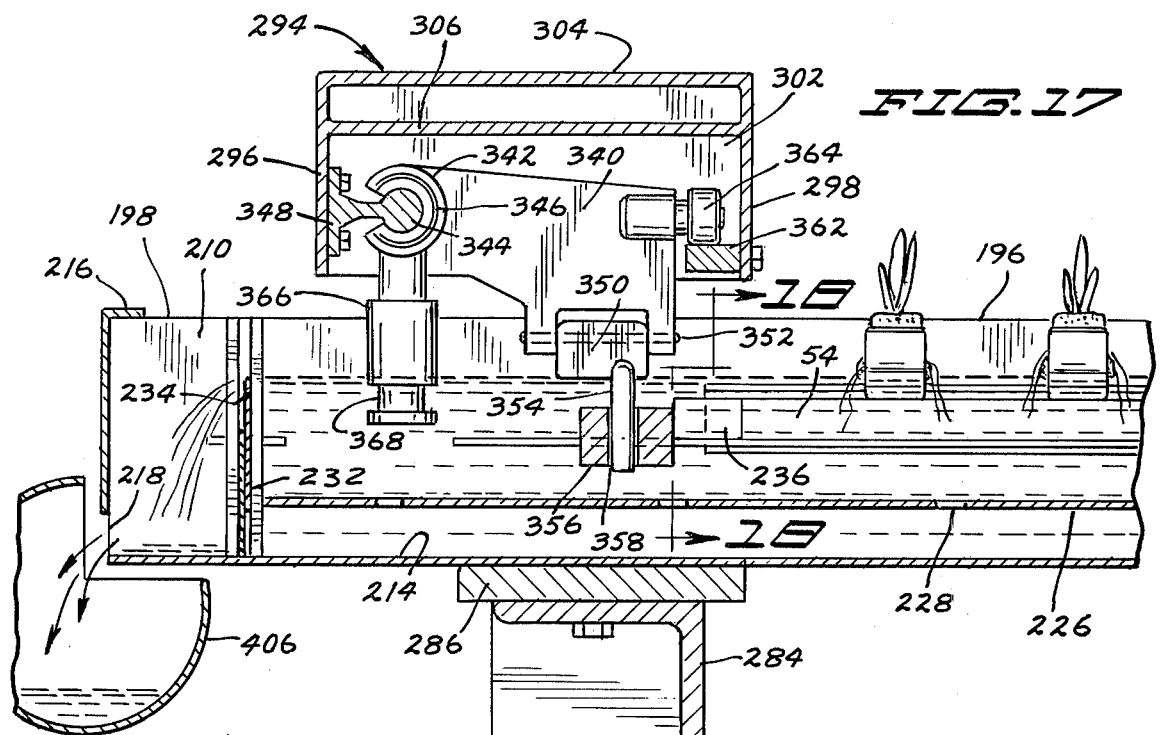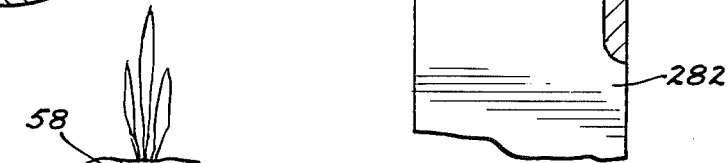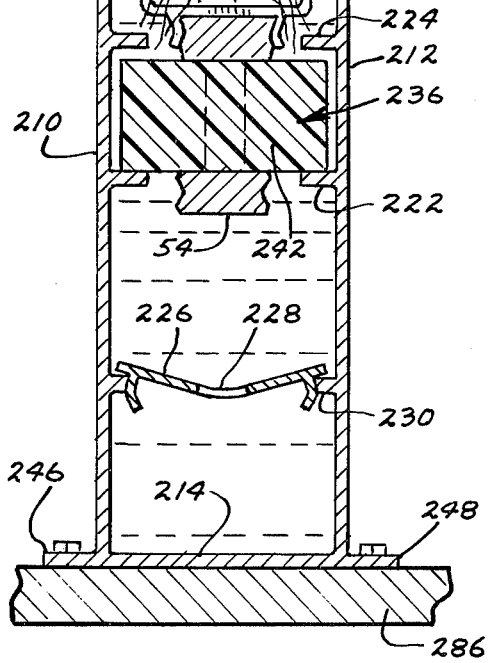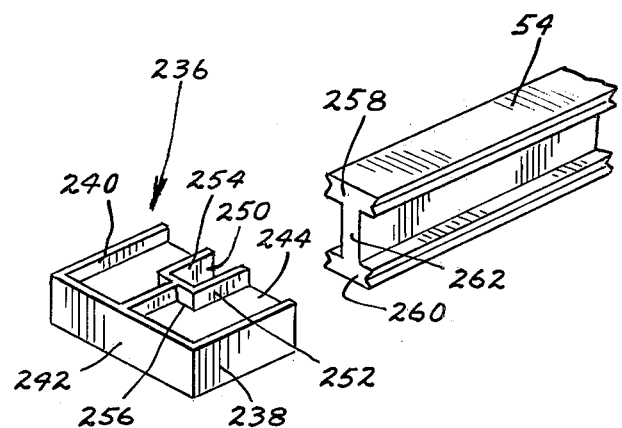

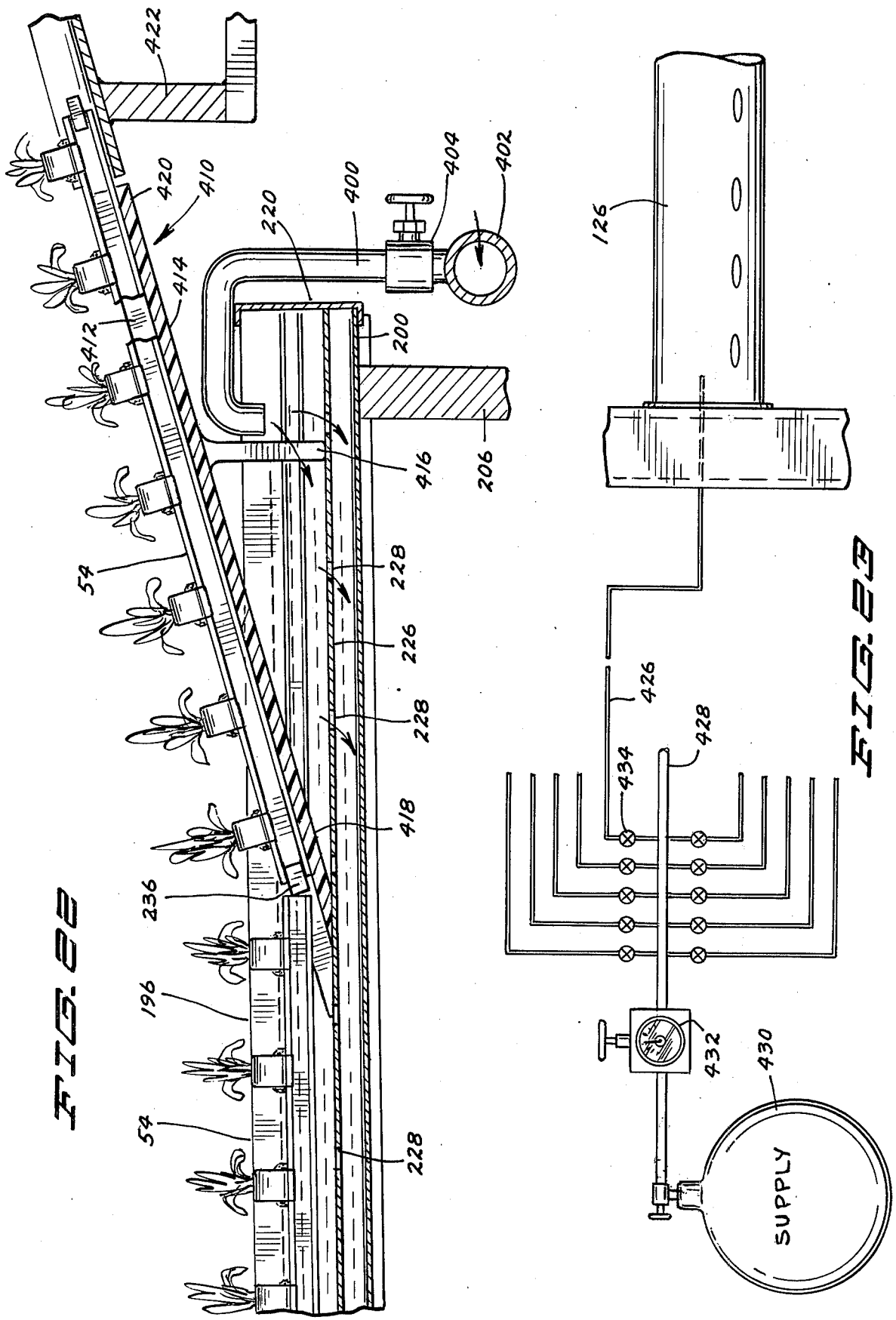

APPARATUS FOR PRODUCING PLANTS

The present invention relates to an apparatus for growing vegetation under controlled conditions, and more specifically to an environmental growth chamber for growing green plants on a continuous basis.

New procedures and apparatuses are constantly being devised for producing plants and edible foodstuffs in a more economical, efficient and productive manner. Efforts are being made to exercise some control over the growing cycle of plants, so that a more uniform and better product is obtain, preferably in a shorter period of time, and with reduced labor and other costs.

Equipment and procedures for growing various kinds of plants such as vegetables, flowers, and the like, are known, and they include buildings such as greenhouses, hot houses, hot beds, climatic chambers and artifically illuminated chambers. One procedure which has recently engendered considerable interest, involves the science of hydroponics. While the science of hydroponics has been practiced for many years, much of it has been done on an experimental or hobby basis. According to the known art, various techniques for soilless cultivation and growing of plants have been devised. As known, a hydroponic system does not require any soil within which a plant is grown. Thus, it is possible to eliminate vast areas of ground and soil within which plants are normally grown, and to allow the seed and plant to grow under relatively compacted or dense conditions, provided however, that adequate light, water and nutrients are present for the plants to grow.

To the best of applicants' knowledge, known systems and techniques for growing plants under most types of controlled environmental conditions, have incurred numerous problems and disadvantages. Known hydroponic systems in particular, have disadvantages and limitations which reduce their overall effectiveness and acceptability. For example, most of the work in the hydroponics science has been performed manually, as it pertains to the handling of seeds from the time that they germinate until the mature plant is ready for harvest. The relatively high cost of labor has limited the commercial acceptability of such systems.

Another important factor which must be considered in such systems involves space requirements for the plants during the growing stage. A minimum amount of space is required when the seeds are first planted; however, as the plants grow and mature, additional space is required to permit them to grow and mature properly. Ideally, space requirements should be minimized by placing the seeds close together, and then providing some means for moving them apart as they grow and require more space. This is usually accomplished by transplanting the plants, i.e., by uprooting and replanting the plants. Transplanting usually requires a relatively large amount of labor, and in many instances, it can adversely affect the plant's growth, at least for a period of time.

Growth factors such as light, temperature and humidity conditions must be closely controlled in these systems. Light conditions are one of the most critical considerations, as it is especially important as a growth factor because it exerts a stimulus on the plants for controlling the generative growth. The amount of light received by the plants in a 24 hour period is important to the development of most plants, depending on the quality, intensity and duration of the light. A difference is made between short-day plants, long-day plants and neutral-day plants. Short-day plants are those which achieve blossoming in a length of less than 13 hours; long-day plants require at least 13 hours of light per day; and netral-day plants achieve blossoming regardless of the length of day. Thus, it is essential that a lighting system be utilized which produces the optimum results for a given plant.

Despite the problems which exist, recent progress, especially in the field of hydroponics, has brought about a certain amount of commercial success, as a result of improved techniques and the development of plant varieties which are especially adapted for hydroponics culture. We have discovered that under controlled conditions, high grade plants can be grown with great rapidity. It is necessary however, to exercise close control over the environment within the growth chamber, as well as the type of nutrient which is administered.

Accordingly, one object of the present invention is to provide a new and improved system for growing vegetation under controlled conditions.

Another object is to provide an improved environmental growth chamber for growing vegetables and other plants, on a continuous basis.

A further object is to provide an apparatus for growing plants under controlled conditions, whereby the conditions such as light, temperature, humidity, and moisture available to the plants, can be readily controlled or regulated.

A still further object is to provide a transfer system for moving individual plants through a growth chamber, such transfer system adapted to accommodate the space requirements for the plants, as the plants increase in size during the growing stage.

Another object is to provide an improved apparatus for hydroponically growing plants on a continuous basis, which shortens the normal growing period required for the plant to mature, and which reduced the labor requirements incurred in such normal growing period.

Other objects and advantages will become apparent from a consideration of the following specification and accompanying drawings, wherein:

FIG. 1 is a diagrammatic floor plan illustrating an installation or growth chamber utilizing the invention;

FIG. 2 is a partial plan view illustrating a rectangular tray for holding a plurality of carrier bars, such bars supporting a plurality of plant holders and plants;

FIG. 3 is a partial plan view similar to FIG. 2, which shows a number of the carrier bars removed from the tray, and a number of the plant holders removed from the carrier bars;

FIG. 4 is a side elevational view of a carrier bar supporting a plurality of spaced-apart plant holders;

FIG. 5 is an end view of the carrier bar illustrated in FIG. 4;

FIG. 6 is a partial side elevational view illustrating a section of a growth chamber shown in FIG. 1;

FIG. 8a is an enlarged partial cross-sectional view taken along line 8a—8a of FIG. 6;

FIG. 9 is an enlarged view, with parts broken away, of the apparatus disclosed in FIG. 6;

FIG. 10 is a partial perspective view of a part of the structure shown in FIG. 6;

FIG. 11 is a partial side elevational view illustrating a portion of another growth chamber shown in FIG. 1;

FIG. 12 is an enlarged partial plan view taken along line 12—12 of FIG. 11;

FIG. 15 is an enlarged partial side view taken along line 15—15 of FIG. 13;

FIG. 16 is a cross-sectional view taken along line 16—16 of FIG. 15;

FIG. 17 is a partial cross-sectional view taken along line 17—17 of FIG. 16;

FIG. 18 is an enlarged cross-sectional view taken along line 18—18 of FIG. 17;

FIG. 19 is an exploded perspective view which illustrates a carrier bar and coupler;

FIG. 22 is a partial side elevational view of the apparatus taken along line 22—22 of FIG. 12; and FIG. 23 is a schematic view illustrating a system for introducing $CO_2$ into the chambers.

Figure 7:
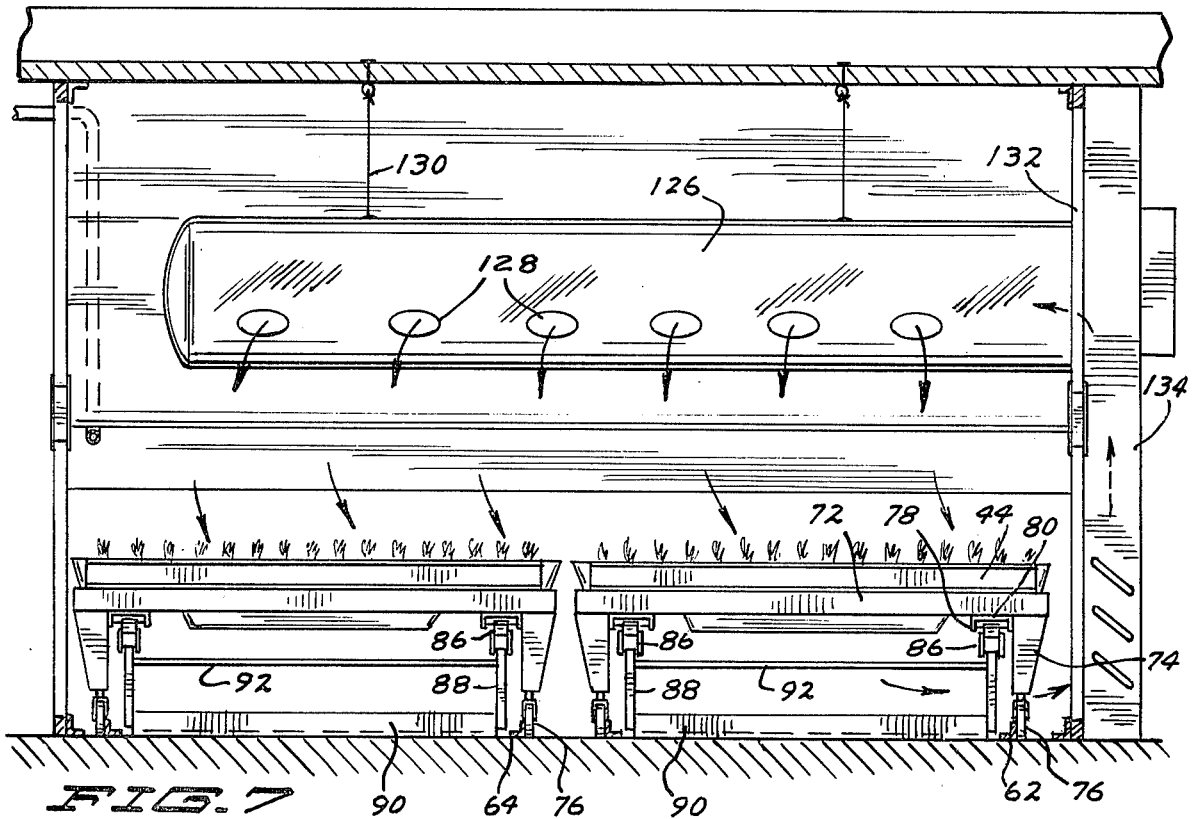
FIG. 7 is a cross-sectional view taken along line 7—7 of FIG. 6.

FIG. 1 illustrates the general configuration of a rectangular-shaped installation or housing 10 utilized in growing plants hydroponically on a continuous basis, in accordance with this invention. For illustrative purposes, the building has been divided into a number of chambers or rooms designated generally by reference numerals 12, 14, 16 and 18. The chamber 12 extends substantially the entire length of the building 10 and it includes a first wall 20 which forms an elongated room, such room being provided with doorways 22 and 24 for gaining access thereto. The chamber 14 is positioned adjacent to the chamber 12, and it is formed by the wall 20 and a second parallel wall 26; it also is provided with a pair of doorways 28 and 30. The chamber 16 is illustrated as being substantially larger than the chambers 12 and 14, and it includes a first wall 32 having a pair of doorways 34 and 36 therein, and a second somewhat shorter wall 38, which forms a passageway or corridor 40 with the exterior wall of the building 10. In addition, the wall 32 is separated from the chamber 14 by a corridor 42. The chamber 18 serves as a storage area, clean-up area, or the like. As will be explained more fully hereinbelow, each of the chambers 12, 14 and 16 serves as a growth chamber in which plants are permitted to grow and reach a certain size, under controlled environmental conditions, so as to provide optimum temperature, humidity, light and space conditions. It should be recognized that the specific arrangement, or layout, within the housing 10 can vary in many ways, as it is envisioned that a variety of structural arrangements might effectively be utilized.

Each growth chamber is designed and constructed so as to provide a predetermined period of illumination followed by a period of darkness. The plants are continuously transferred or pushed through the growth chambers, so that they are subjected to alternate periods of light and darkness. Generally, the periods of light and darkness can vary in length, depending upon the specific requirements of the individual plant. Moreover, different plants will require different growth periods in their respective cycle.

The invention is especially well suited for producing food plants such as Bibb lettuce, and will be described with particular reference thereto. It must be understood of course, that the invention is capable of broader application and might be used for continuous production of many varieties of green plants. Accordingly, for illustrative purposes, as shown in FIG. 1, chamber 12 has been constructed so that the plants are within the chamber, subjected to alternate day and night cycles, for a total of 14 days. It should be pointed out that during the first two days, the seeds from which the plants grow, are permitted to germinate, under specific environmental conditions, and usually no periods of darkness are included. Thereafter, as shown, they move through the chamber for an additional 12 days. After they have passed through chamber 12, they are introduced into the chamber 14, for an additional 7 days. Finally, they are introduced into the chamber 16 for a period of 7 more days. It has been found that plants such as Bibb lettuce, reach optimum maturity in a period of 28 days. Other plants might require longer or shorter growth periods.

Under typical growth conditions, the plants will attain a prescribed size in each chamber. During the first 14 days, a minimum amount of space is required for each plant; thus, it is permissible to position the individual plants as close together as possible. As the plants grow however, additional space is required to permit them to expand adequately, and during the last 7 days, a maximum amount of space is required.

At this point, reference should be made to FIGS. 2, 3, 4 and 5. FIGS. 2 and 3 illustrate the top view of a rectangular tray designated by numeral 44; having a pair of side walls 46, a pair of end walls 48, and a bottom surface 50. A pair of dividers 52 are positioned along the side walls 46, and a plurality of carrier bars 54 are retained within the tray 44 by the retainers 52. FIGS. 4 and 5 illustrate the carrier bar 54 removed from the tray. The carrier bars serve as the basic component for transporting the plants through the system from seeding to harvest. As shown in FIG. 2, the carrier bars 54 can be positioned within the tray 44 so that they are proximate each other. By removing every other bar 54 from the tray, however, the space between the remaining bars can be substantially increased. FIGS. 2-5 also show a plurality of plant holders or clips 56 removably attached to the carrier bar 54, by merely snapping them onto the bar. The plant holders 56 can readily be removed from the bars by merely pulling them off. A growth block 58 is placed in each plant holder, and it is adapted to hold the seed, as well as the plant during its growth cycle. As depicted, each block 58 is provided with a cavity or opening 66, which extends into the block. This cavity retains the seed in the block.

The growth blocks 58 serve a number of purposes. They hold the plant seeds, they provide a support for the plants as they grow, and they provide moisture to the seeds and plants. Preferably, the blocks must be capable of absorbing moisture, and the plants should be able to penetrate into the blocks. We have found that fibrous blocks formed from inexpensive waste products of wood and/or paper, peat, sphagnum moss, or the like, work quite satisfactorily. It must be realized that other forms of blocks, such as sponge blocks, might also be used as well. In general, blocks of the desired type are commercially available.

FIG. 2 illustrates the plant holders 56 and growth blocks 58 as being closely nestled together in the left-hand portion of the tray 44. This Figure also depicts a number of the carrier bars as being removed therefrom, and placed in the tray 44 shown in FIG. 3. It should be observed that every other plant holder 56 has been removed from the carrier bars 54 in FIG. 3, so that the relative spacing between the individual plants along the longitudinal axis of the bar, has been greatly increased.

Reference is again made to FIG. 1. As the loaded trays 44 are removed from the chamber 12, they are immediately introduced into the chamber 14. Since additional growing space will now be required, every other carrier bar 54 is removed from the tray 44 and placed in a new tray 44. Thus, four trays are filled from the one tray, and they are all introduced into the chamber 14, when space is available, usually in pairs. Under typical conditions, two trays are removed from the chamber 12 daily; and all the carrier bars 54 are introduced into the chamber 14. In a like manner, the trays 44 are removed from the chamber 14 in pairs. At this point, the carrier bars 54 are removed from the trays 44 and introduced into one of two elongated, diverging track or trough assemblies 60 positioned within the chamber 16. As noted, the length of the trough assemblies is such that it covers a major portion of the chamber 14.

Reference will now be made to the apparatus, also referred to as the cart pusher system, for moving the trays 44 through the chambers 12 and 14. Since this apparatus is substantially the same in both chambers, it is necessary to merely describe one; FIGS. 6-10 illustrate the interior of a portion of the chamber 14. As depicted, the trays 44 are mounted on wheeled carts 70, which are movable along the longitudinal axis of the chamber. Each cart includes a frame 72 secured to the upper end of four legs 74; a small wheel 76 is rotatably secured to the bottom end of each leg, so that the cart can be freely moved about. A pair of elongated channel members 78 are secured to the bottom surface of the frame 72, and each channel member includes a plurality of spaced apart pusher plates or crosspieces 80 (see FIGS. 9 and 10).

A pair of rail or track systems 62 and 64 are secured to the floor of the chamber 14 so that they extend longitudinally within the chamber. Each rail system includes two parallel rails, which are spaced apart, a slightly smaller distance than the spacing between a pair of wheels 76 on the cart 70. Thus, the rails guide the carts 70 through the chamber 14, as they are pushed therethrough.

A pusher system 82 is provided for pushing or propelling the carts 70 from one end of the chamber to the other end. The pusher system 82 is comprised of a frame construction which includes a pair of parallel frame members 84 secured to the floor of the chamber by appropriate means (not shown), a pair of parallel pusher bars 86 pivotally attached to the frame members 84 by means of legs 88, and appropriate cross members 90 and 92, to provide support and rigidity. A plurality of spring loaded lugs 94 are pivotally secured to each of the pusher bars 86, so that they are axially aligned theralong. As can be seen in FIG. 9, the lugs 94 project upwardly, so that they can engage the pusher plates 80 within the channel member 78. Springs 96 are provided for urging the lugs 94 in an upward direction; the lugs however, can be readily pushed downwardly against the biasing action of the springs.

Figure 8:
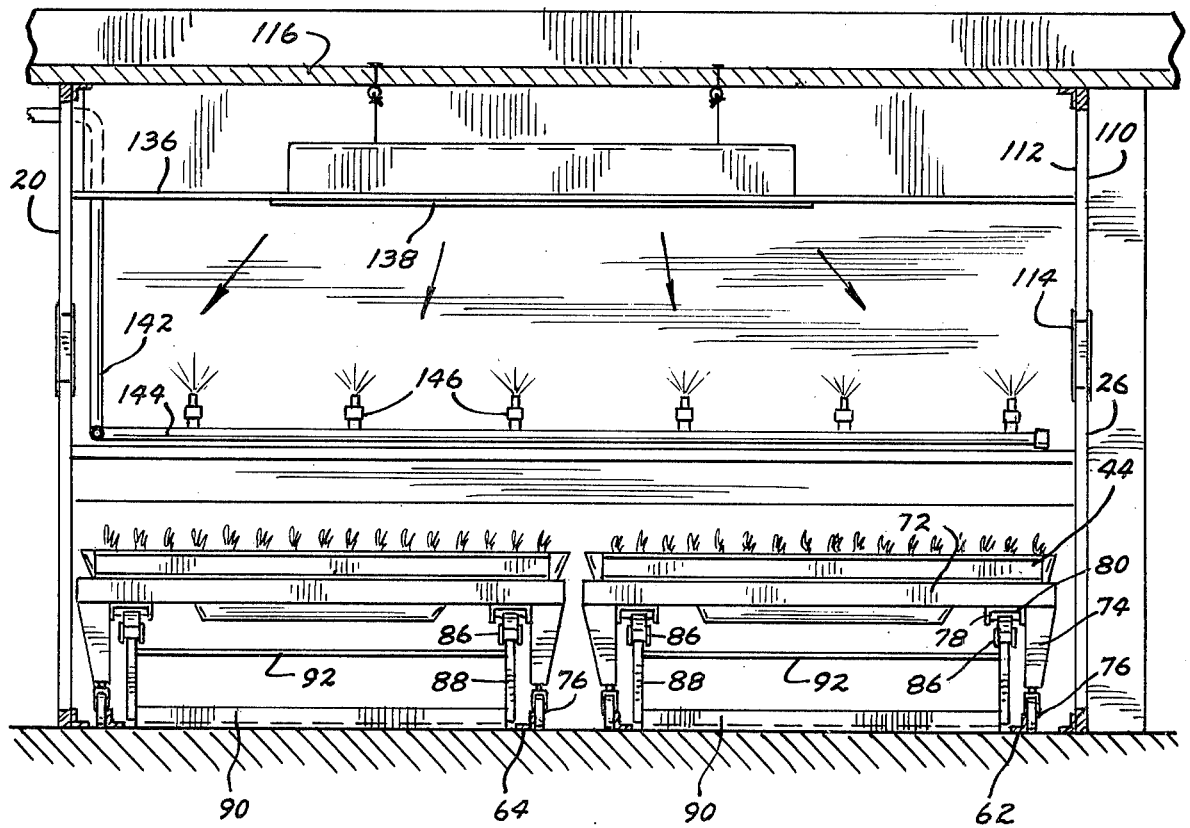
FIG. 8 is a cross-sectional view taken along line 8—8 of FIG. 6.

The pusher bars 86 are caused to move relative to the frame members 84, by means of an eccentric 98 which is operatively connected to at least one of the legs 88 by a connecting arm 100. The eccentric 98 is actuated by a motor 102 and appropriate gear reducers. Gear reducers and eccentrics are well known and commercially available, hence, they will not be described in detail. Since a double track system is provided in chamber 14, as shown in FIGS. 7 and 8, appropriate means might be provided for pushing both sets of carts from a single drive system. If preferred of course, separate drive systems might be provided for pushing each set of carts separately.

The carts 70 are introduced into the chamber so that they straddle the rails 62 or 64, as well as the pusher system 82. The channel members 78 are aligned relative to the pusher bars 86 so that one of the lugs 94 engages one of the spaced-apart pusher plates 80. As the eccentric 98 is activated, the crank arm 100 causes the pusher bars 86 to move or pivot relative to the frame members 84. As shown in FIG. 6, a plurality of carts 70 are aligned within the chamber so that one abuts against another. In this way, they are effectively pushed through the chamber, by the cart or carts engaged by the pusher system 82.

At this point, it is pointed out that substantially the same type of pusher system is used in pushing the trays and carts through the chamber 12. The major difference is that only a single rail system is provided in this chamber. This is a matter of design choice however, as it is contemplated that a different layout might readily be employed, as well.

The trays 44 are formed in such a manner that they will hold a fluid medium. The carrier bars 54 support the growth blocks 58 within the trays, so that they are suspended above the bottom surface of the tray, note FIG. 9. The fluid medium is maintained at a prescribed level within the tray, so that at least a portion of the growth block is immersed in the fluid medium. In a hydroponics system it is preferable that the plants be emersed in the fluid medium at all times; care should therefore be taken, to maintain the fluid level at a minimum level within the tray so that this objective is attained. Maintaining the fluid at a prescribed level can be accomplished manually, if desired, or by appropriate pumps.

FIGS. 6–8 also illustrate the interior of the chamber 14 and the manner in which it is compartmented to provide alternate periods of light and darkness. The walls 20 and 26 are preferably formed of sheets of thin plastic film 110 and 112, formed of polyethylene or the like, which are separated by a layer of air, for insulation purposes. FIG. 8a illustrates the relative spacing between the films 110 and 112. A plurality of windows 114 are mounted within the walls, for viewing into the chamber. A ceiling member 116 forms the top surface of the chamber.

A number of flaps 118, formed of a heavy fabric material, are secured to the ceiling 116 by appropriate means, not shown. The flaps drape downwardly, so that their bottom edges 120 are spaced a short distance above the top of the trays, and they divide the chamber into compartments A and B. A pair of slats 122 are secured to the flaps 118 proximate their edges 120, and a pair of flaps are linked together by appropriate means, such as a cable 124. By adjusting the length of the cable 124, the relative spacing between the flaps can be adjusted; thus, effectively varying the length of daytime and nighttime hours. A tubular baffle 126, having apertures 128 therein, is positioned within compartment B, between a pair of flaps 118, by suspending it from the ceiling by means of hangers 130. As illustrated in FIG. 7, the end 132 of the baffle 126 is connected to a vertical duct 134 positioned outside of the chamber; the ducts and baffles are provided for introducing cooled air into the compartment. As will be explained more fully hereinafter, the compartments B provide the nighttime environment for the plants.

The compartments A on the other hand, provide the daytime environment for the plants. A suspended ceiling 136 provides a housing for mounting light fixtures or lamps 138 within the compartments A, such lamps being connected to an appropriate electrical source. The lamps should provide a high level of illumination; thus, multiple lamps 138 preferably extend across the compartments A. While the particular type and number of lamps used can vary, preferably they are high intensity lamps and are positioned in the ceiling 136. Furthermore, since the temperature level surrounding the lamps can rise appreciable, it is advisable to provide some means (not shown) for cooling the lamps and withdrawing the heat generated thereby. Various types of lamp cooling arrangements are known, such as large fans or ventilators. U.S. Pat. No. 3,869,605, which issused to Noel Davis discloses one type of lighting structure which might be used.

A sprinkler system 140 is provided for introducing a fluid spray into each of the compartments A. The sprinkler system includes a manifold section 142, and arms or branches 144 which extend into each compartment A. The section 142 is connected to a pressurized fluid medium source, not shown. One or more nozzles 146 are mounted in the branches 144 for introducing the spray into the compartments.

Chamber 12 is provided with a similar construction for pushing the single row of carts from one end to the other. Moreover, the specific construction of the compartmented chamber is substantially the same as that described in conjunction with chamber 14. It must be recognized however, that certain structural variations might be desired. For example, it may be unnecessary or undesirable to provide the baffles 126 in the first chamber. Moreover, since a period of germination of the seeds is usually included during the growing cycle, it might be necessary to provide special conditions to aid in the germination step. For example, the use of fluorescent lights, rather than high intensity lamps, might be appropriate for the first day or two while the seeds are germinating.

FIG. 11 illustrates a portion of the interior of chamber 16. The walls 32 and 38 are formed in substantially the same manner as the walls 20 and 26 described in conjunction with chambers 12 and 14. As shownin FIG. 13 for example, the walls are formed of sheets of plastic film 150 and 152, such sheets being separated by a layer of air. Windows 154 permit viewing into the chamber. The ceiling 116 forms the top surface of the chamber.

Figure 14:
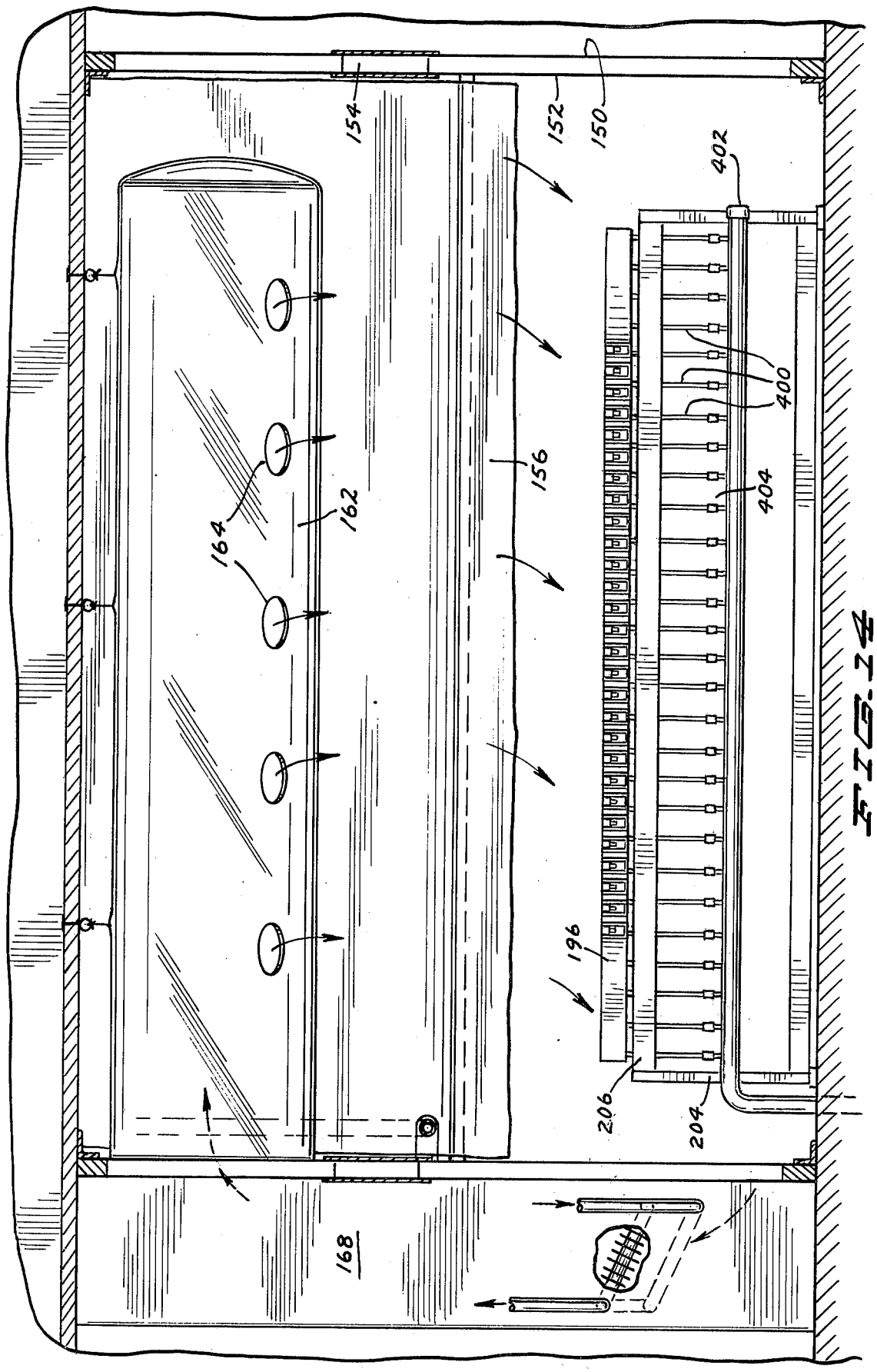
FIG. 14 is a cross-sectional view taken along line 14—14 of FIG. 11.

A plurality of flaps 156 divide the chamber into compartments C and D. The flaps 156 are similar to the flaps 118 positioned within chamber 14, and they drape downwardly in the same manner. Slats 158 are joined together by a cable 160, so that the relative spacing between the flaps can readily be adjusted. A tubular baffle 162, having apertures 164 therein, is suspended within each of the compartments D. As depicted in FIG. 14, the end 166 of baffle 160 is operatively connected to a vertical duct 168, positioned exteriorly of the chamber 14. Cooled air is introduced into the compartment D through the duct 168 and baffle 162, and withdrawn from the chamber through openings 170 located proximate the bottom of the chamber.

The compartments C are effectively formed by the flaps 156, as well. Each compartment is illuminated by light fixtures or lamps 172 mounted in a suspended ceiling 174. The lamps 172 are preferably the same as the lamps 138 previously described. A sprinkler system which includes a manifold section 176 and arms or branches 178, is included for introducing a fluid spray into the compartment through nozzles 180. Hangers 182 suspend the sprinkler system within the compartments C.

Reference will now be made to the elongated diverging trough assemblies 60 located within chamber 16. Assemblies 60 are also referred to as tracks, because they guide the carrier bars 54 along a predetermined path. As viewed in FIG. 1, a pair of the trough assemblies 60 are mounted in side-by-side relationship within the chamber 16. Each assembly includes a first end portion 190, and a second end portion 192, which is wider than the first end, so that the overall configuration as viewed from the top, is somewhat fan-shaped. Since the assemblies 60 are virtually identical in construction and operation, it will be necessary to describe only one of them. It might be pointed out, that by orienting them so that the first end 190 of one assembly is proximate the second end 192 of the other, better utilization of the space within the chamber 16 is achieved. Moreover, if preferred, the assemblies 60 might be oriented within the chamber, so that the edges 194 of the assemblies are parallel to, and proximate the walls 32 and 28. This too, would help to reduce the space requirements.

As illustrated in FIGS. 14–14, the trough assembly 60 includes a plurality of elongated troughs or tracks 196 which are arranged relative to each other so that they form a fan-shaped array of pathways which extend from one end of the chamber 16 to the opposite end thereof. As seen more fully, in FIG. 12, the second or discharge ends 200 of the tracks 196, diverge outwardly so that they are spaced apart a greater distance than the first or inlet ends 198. The troughs 196 are supported in side-by-side relationship, by means of a support structure which includes a frame construction 270, and vertically oriented legs 204 and cross braces 206, positioned proximate the second ends of the troughs. If desired, additional legs and cross braces might be interposed between the trough ends for support purposes. A carrier pusher mechanism designated by numeral 202, is movably mounted on the frame 270 and it will be described in greater detail below. As depicted in FIG. 11, the troughs are inclined, so that discharge ends 200 are raised or elevated relative to the inlet ends 198, for a purpose to be described later.

FIGS. 17 and 18 illustrate the troughs 196 and the manner in which they support the carrier bars 54 during operation. Each elongated trough includes a pair of parallel side walls 210 and 212 which are interconnected by a bottom wall 214. As shown, the bottom wall projects beyond the side walls to form a pair of flanges 246 and 248. A cap member 216 is affixed to each end 198 of the trough so that the end is substantially enclosed, and an opening 218 is formed in each cap 216. A cap member 220 is secured to the second end 200 of each trough as well, however, no openings are provided in it.

Each side wall is provided with a channel positioned above the bottom wall 214. The channels are formed by ribs 222 and 224 which extend along the length of the trough. A trough cap or separator 226 having spaced apart apertures 228 along its longitudinal axis, is interposed between the channel and the bottom wall 214, and is supported by ribs 230. A pair of rectangular plates 232 are slidably retained between the side walls 210 and 212 proximate the cap 216, so that it forms a weir. As illustrated in FIG. 17, its top edge 234 is somewhat lower than the top edge of the trough. This FIGURE also illustrates the trough as containing a fluid medium; the level of the fluid within the trough is controlled by the height of the weir 232. As the amount of fluid within the trough increases, it will eventually flow over the top edge 234 of the weir. Since the weir plates are independently vertically adjustable, the relative fluid level within the trough can be to some extent, controlled.

THe carrier bars 54 are movably supported within the trough by means of a coupler 236, secured to each end of the bar, note specifically FIG. 19. As shown, the coupler 236 generally includes vertical side walls 238 and 240, an end wall 242, and an intermediate horizontal wall 244 normal to the walls 238–242. The wall 244 is generally interposed between the top and bottom edges of the walls 238–242. A notch 250, is formed in the intermediate wall 244, and it is surrounded by vertical walls 252, 254, and 256. The relative height of the walls 252–256 is slightly smaller than distance between the two horizontal portions 258 and 260 of the carrier bar 54. Moreover, the distance between the walls 252 and 254 is slightly smaller than the width of the vertical portion 262 of the bar 54. The couplers 236 are preferably formed of a plastic material. A coupler 236 is attached to each end of the carrier bar 54, by slidably positioning the bar end into the notch 250 of the coupler; by dimensioning properly, the walls 252 and 254 will grip the member 262 of the bar 54, as a result, the coupler cannot easily be removed from the bar 54.

As viewed in FIG. 18, the width of the couplers 54 is slightly smaller than the distance between the walls 210 and 212 of the trough. Thus, they can be inserted within the channels formed by the ribs 222 and 224. At this point, it might be noted that the rib 224 is machined off or removed, proximate the trough ends 198 and 200, so as to permit the carrier bars 54 to be inserted within the channels and removed therefrom. This section must of course, be at least slightly longer than the length of the carrier bar.

Reference is now made to the carrier pusher mechanism 202 as exemplified more fully in FIGS. 11, 15, 16 and 17. The frame construction 270 supports the ends 198 of the troughs 54. The frame includes a first side portion comprised of lower and upper parallel frame members 272 and 275, and a plurality of legs or posts 276; a second side portion comprised of lower and upper parallel frame members 278 and 280, and a plurality of legs 282; and a plurality of crosspieces 284 which maintain the sides in spaced-apart relationship, and support the frame 270 in a rigid manner. Appropriate means are provided for securing the lower frame members 272 and 278 to the floor of the chamber 16, so that the frame is stationary. At least one of the crosspieces 284 has an L-shaped cross-section, see FIG. 17, and means are provided (not shown) for rigidly securing its ends to the legs 276 and 282. A flat board 286 is securely fastened to the top surface of the L-shaped crosspiece; and the troughs 196 are fastened to the board 286 proximate the ends 198, by securing the flanges 246 and 248 thereto. In this manner, the troughs 196 are immovable relative to the frame 270 and floor of the chamber. A pair of guide rails 290 and 292, having a semihemispherical cross section, are secured to the top edge of the upper frame members 274 and 280, and they extend substantially the entire length of the frame members 274 and 280.

The carrier pusher mechanism 202 is mounted for relative movement along the top surface of the frame 270, and more specifically, the guide rails 290 and 292. The mechanism includes a rectangular-shaped carriage housing 294 which generally bridges or spans the distance between the guide rails 290 and 292, i.e. transverse to the length of the troughs. The carriage housing includes a pair of side walls 296 and 298, a pair of end walls 300 and 302, a top wall 304, and a support wall 306 which is parallel to the top wall 304. A support plate or mounting bracket 308 is secured to each of the end walls 300 and 302 by appropriate means. A pair of rollers 310 and 312 are attached to each end of the carriage 294, by rotatably mounting them on shafts 314 and 316 respectively. The shafts 314 and 316 are secured at one end to the support plate 308. Each roller is designed so that it will freely roll along the top surface of the guide rails 290 and 292.

The carriage 294 is caused to traverse the span of the frame 280 by means of an endless roller chain 320 which is drivingly connected to a support plate 322. The support plate 322 is secured to the carriage housing 294 by connecting it to the shafts 314 and 316, as well as by means of one or more bolts 324 which threadedly engage the support plate 308 and end wall 300. The support plate 322 is attached to the roller chain by a connecting link 326 which engages a portion 328 of the plate 322.

As viewed in FIG. 11, the roller chain encircles sprockets 330, 332, 334 and 336 fixedly connected to shafts rotatably mounted in the frame 270. The chain is caused to move by a motor and gear system which will be described hereinafter. A chain guide 338 covers a portion of the exposed chain 320. While the drawings only illustrate a roller chain and associated components on one side of the frame 270 and carriage 294, a similar drive is mounted on the opposite side. Means are provided for driving both sets of roller chains at the same rate of speed.

A plurality of pusher carriages 340 are mounted within the carriage housing 294, and they are provided for exerting a pushing force against the ends of the carrier bars 54. A separate pusher carriage is included for each trough 196 included in the system. Each carriage 340 is provided with a hub 342 which is slidably positioned on a shaft 344 by means of a linear bearing 346. The shaft 344 extends substantially the entire length of the carriage housing 294, and it is secured to the housing wall 296 by support members 348 to move axially along the axis of the shaft 344.

A pusher bracket 350 is pivotally connected to the pusher carriage 340, by means of a pin 352. The pusher bracket 350 includes a downwardly projecting finger 354 which projects through a bore 358 in a block pusher 356. The bore 358 is preferably somewhat larger in diameter than the finger 354. As viewed in FIG. 16, the block pusher 356 is provided with a groove 360 on each side, which permits the pusher 356 to be slidably positioned on the ribs 322 secured to the trough walls.

As shown in FIG. 17, the block pusher 356 is adapted specifically, the coupler 236. As the force required to push the bar increases, a moment is created which tends to cause the pusher carriage to pivot about the axis of shaft 344. Since this might adversely affect the operation of the system, a bearing surface or cam 362 and cam follower 364 have been provided. The cam 362 has a rectangular cross section and it is approximately the same length of the housing 294. The cam 362 is secured to the inside surface of the wall 298 by appropriate means, such as bolts. The cam follower 364 is rotatably mounted in the pusher carriage 340, and it bears against the top surface of the cam 362. A guide roller 366 is rotatably connected to the underside of the hub 342, so that it projects into the trough 196. It is provided with a groove 368 which permits it to pass between the ribs 224. In this regard, note FIGS. 16 and 17.

At this point, it might be well to explain the operation of the pusher carriage 340. Relative movement of the roller chain 320 causes the rollers 310 and 312 and the support plate 322 to move along the guide rails 290 and 292. Rotational movement of the rollers in turn, causes the carriage housing 294 and the pusher carriage 340 to move, as well. As the pusher carriage moves forward, the block pusher 356 abuts against the coupler 236 and exerts a force against it, thus causing the causing the carriage bar 54 to slide along the longitudinal axis of the trough 196. Since the troughs 196 diverge outwardly, the pusher carriage 340 and its components might tend to bind within the trough, unless some adjustment means is provided. THe pivotal connection of the pusher bracket 350 relative to the carriage 340, as well as the relatively loose connection between the finger 354 and the block pusher 356, afford some flexibility and adjustability between the components. The guide roller 366 follows the trough walls 210 and 212, and it causes the carriage 340 to slide along the axis of shaft 344, as the pusher mechanism 202 traverses the length of the guide rails 290 and 292. While the total distance that the mechanism 202 travels is relatively small, when compared to the total length of the troughs 196, sufficient divergence of the troughs exists, to possibly present a problem if some means isn't provided to accommodate such divergence.

Figure 21:
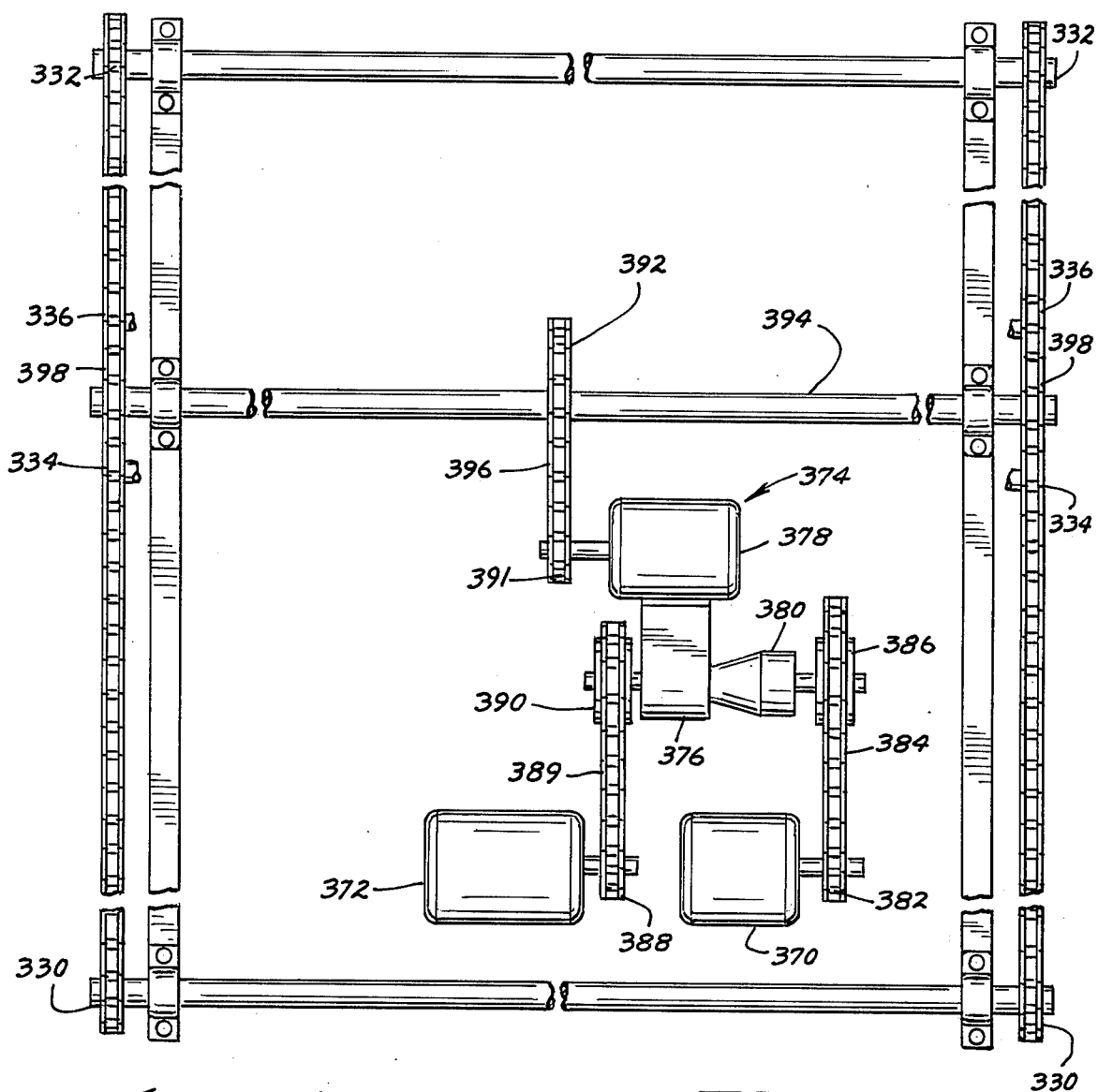
FIG. 21 is a schematic view which illustrates the components included in a drive system used in the invention.
Figure 20:
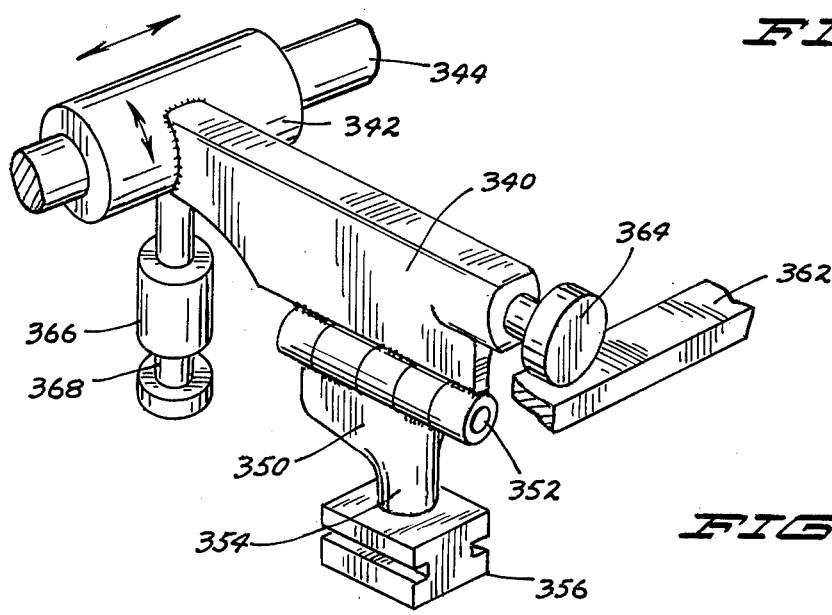
FIG. 20 is an enlarged partial perspective view which illustrates a portion of the apparatus disclosed in FIGS. 16 and 17.

A pair of motors, a gear reducer and appropriate clutches are provided for imparting relative movement to the carriage housing 294 in two directions. A first motor 370 is provided for moving the carriage housing 294 forward at a relatively slow rate, e.g., a distance of six feet over a 12 hour time period. A 1/20 h.p. motor rotates at 30 rpm has been found to work suitably for this purpose. A second motor 372 which is reversible in nature, is provided for moving the carriage housing 294 in both a rearward and a forward direction, at a substantially higher speed than the first motor 370. A ¼ h.p. motor having an output rpm of 1725, has been used with satisfactory results. Each motor is operatively connected to, and adapted to drive, a gear reducer 374. The gear reducer includes an input portion 376 and an output portion 378. Specific reference should be made to the schematic view of the drive components illustrated in FIG. 21.

A clutch 380 is operatively connected to a shaft in the input portion 376 of the gear reducer 374, and each motor is in turn, also operatively connected to the input shaft of the gear reducer. The motor 370 is provided with a sprocket 382 on its output shaft, and a chain 384 connects such sprocket to a torque limiter or slip clutch 386 mounted on an input shaft which projects from the clutch 380, the output shaft of the clutch connects to the input portion 376 of the gear reducer. The motor 372 is provided with a sprocket 388 on its output shaft, and a chain 389 drivingly connects such sprocket to a torque limiter or slip clutch 390 mounted on an input shaft of the gear reducer input portion 376. The torque limiters prevent damage to the components in the event that excessive loads are encountered.

An output shaft which projects from the output portion 378 of the gear reducer is operatively connected to a sprocket 392 mounted on a shaft 394 by a drive chain 396 which engages a sprocket 391 on the output shaft of the reducer. The shaft extends across the width of the frame 270 and it is mounted for rotation in appropriate bearings connected to the frame 270. A sprocket 398 is attached to each end of the shaft 394, and they are aligned with, and engaged by the roller chains 320. Since the distance between the sides of the frame 270 might be fairly large, the length of the shaft 394 will be quite long as well. We have found that preferably, the sprocket 392 should be affixed to the shaft proximate its center, so as to minimize the torque created on the shaft as the sprocket 392 is rotated. Moreover, it might be preferable to divide the shaft 394 in half and provide appropriate support bearings; and provide two sprockets 392, one secured to each shaft, for driving the roller chains 320. In such instances, a double chain 396 would be required.

All the various components used in the drive system such as the motors, clutches, and the like are commercially available items, therefore, it will not be necessary to describe their specific construction in detail.

The drive system is actuated by energizing one of the motors. As the motor 370 is energized, rotational motion is transmitted to the shaft 394 through the torque limiter 386, the clutch 380 and the gear reducer 374. Since the motor 370 has a low rpm rate, the shaft 394 is caused to rotate at a slow speed, and consequently, the carriage 294 moves along the guide rails 290 and 292 at a very slow rate. As indicated above for example, it is desirable to traverse the distance from one end of the frame to the other end over a relatively long period of time; e.g., 6 hours. Since the motor 372 is operatively connected to the same input shaft in the gear reducer as the motor 370, it is also caused to idle (even though it is not specially energized) while the motor 370 is in operation. Since the motor 370 rotates so slowly, no harm or damage is done to the components of the motor 372.

After the carriage housing 294 reaches the end of its run, i.e., the second end of the frame 270, the motor 370 is de-energized, and the relative movement of all the drive components stops. At this point, it is desirable to return the carriage housing 294 to the first end of the frame 270 as quickly as possible, so that it will continue to push the carrier bars, and attached plants, through the troughs. Since the motor 370 has a slow output speed, it would take the same amount of time to traverse the distance in the reverse direction. Therefore, the reversible, higher speed motor 372 has been included for returning the carriage housing 294 to the first end of the frame relatively fast. By energizing the motor 372, most of the components are caused to move in the opposite direction. The clutch 380 however, is included for disengaging the motor 370. Since the motor 370 rotates at a slow rpm, and in only one direction, considerable damage might be sustained by it if it was forced to rotate in a reverse direction at the same speed generated by the motor 372. Thus, the clutch 380 permits the motor 372 to function independently of the motor 370, when the motor 372 drives the carriage housing to its start position. It might be pointed out further, that since the motor 372 is reversible, it can also cause the carriage housing 294 to move in a forward direction, at a faster rate than the motor 370. This may be desirable under certain conditions, for example, to quickly move the block portions 356 of the carriage system, into position behind a carrier bar 54.

Since it is intended that the herein described apparatus is to be used as part of a hydroponic system, it is necessary to provide some means for introducing a fluid medium into the troughs 196, as well as removing the fluid therefrom. FIG. 22 shows an inlet conduit 400 positioned at the second or elevated end 200 of each trough 196, for introducing a solution into the trough. Each conduit 400 is connected to a manifold 402, which in turn is connected to a tank or other source of the solution. A valve 404 is provided for controlling the flow of the solution from the manifold into the conduit. As pointed out hereinbefore, the second ends of the troughs 196 are elevated with respect to the inlet ends; as a result, the solution flows from the second ends toward the first ends. It should be borne in mind, that the flow of the solution is opposite to the direction of movement of the carrier bars 54. As the carrier bars 54 reach the second ends of the troughs 196, the plants attached to the bars have normally reached maturity. Ofttimes the plants may have developed a root system sufficiently large enough to interfere with the free flow of the solution within the trough. As a result, the plants at the first ends of the troughs, may not receive an adequate supply of the solution to insure proper growth. The trough cap 226 mounted within the troughs, prevents the roots from reaching the bottom of the trough and effectively blocking the free flow of the solution within the troughs.

Figure 13:
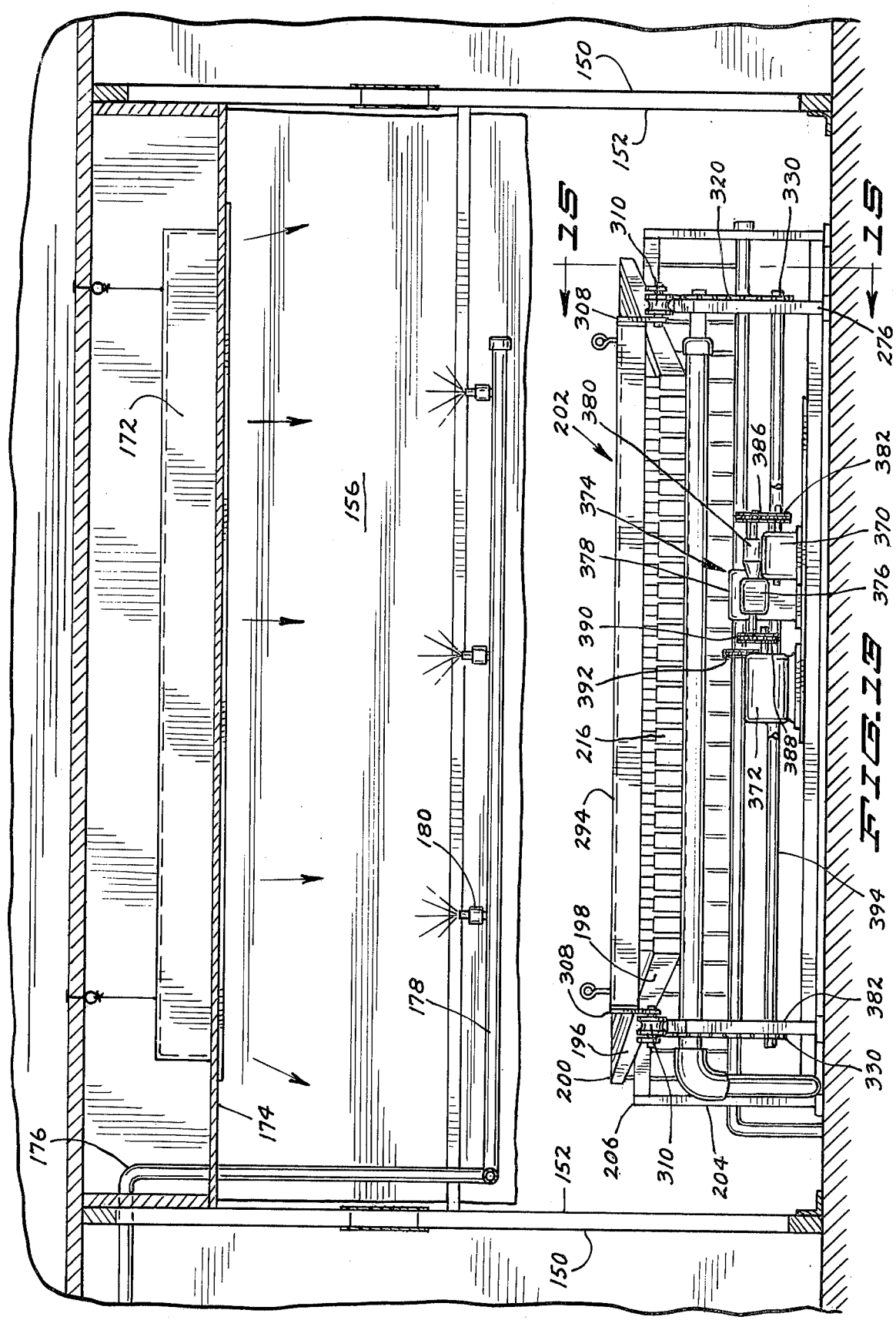
FIG. 13 is a cross-sectional view taken along line 13—13 of FIG. 11.

The pitch of the troughs 196 should be large enough to assist in permitting the solution to flow freely within the trough, and maintain a desired level therein. The weir 232 effectively prevents the solution from being discharged from being discharged from the trough unless it flows over its top edge. As the solution flows over the weir 232, it is discharged from the trough through the discharge opening 218, into a discharge conduit 406. As shown in FIG. 13, the conduit 406 receives the discharge solution from all of the troughs 196. The conduit 406 carries the solution to a holding tank (not shown) or other appropriate vessel, for reuse or disposal.

As the carrier bars 54 reach the discharge end 200 of the troughs 196, they must be removed therefrom as soon as possible, otherwise they will interfere with the free movement of the carrier bars remaining the trough. Accordingly, an unloading ramp 410 is provided for automatically removing the carrier bars 54 from the troughs. The ramps 410 are formed of an elongated U-shaped member, having a pair of side walls 412 interconnected by a bottom wall 414. A pair of spaced apart legs 416 support the ramp 410 and maintain it in an inclined position so that a first end 418 is positioned within the trough proximate the carrier bars 54 so they move within the trough, and a second end 420 is raised to an elevated position above the conduit 400.

The leading end of the carrier bar 54 is caused to slide onto the ramp 410 as it reaches the discharge end of the trough. As it continues its movement up the ramp, it is deposited in a storage rack 422, or other appropriate device. It might be pointed out that the couplers 236 attached to each end of the carrier bars 54, abut against each other as they are being moved through the troughs.

The solution used for feeding the plants can vary quite extensively, depending upon the specific plants being grown. In most instances it is desirable to use a solution which has been fortified with various nutrients, such as nitrogen, potassium, phosphorus and certain trace elements. The specific concentrations of each component can be varied to fit the specific plant requirements. In some instances, it might be unnecessary to use anything other than a water solution; it should be realized of course, that this would be feasible for only a relatively short period of time. otherwise the plants will not grow properly. The composition of the solution used, might be the same throughout the growth cycle, i.e., in both the trays 44, as well as the troughs 196. On the other hand, it might be preferred to change the specific composition of the solutions for different stages in the plant's growth cycle. Furthermore, in certain instances it might be desirable to introduce a spray solution into the chambers through the nozzles 146 (in chamber 14) or nozzles 180 (in chamber 16) to compensate for some deficiency in the plant nutrition during its growth. While the specific temperature of the solution will probably not be critical, it might be desirable to either heat or cool the solution, for specific plants. These aspects are deemed to be within the knowledge of those skilled in the art of plant husbandry; therefore no further presentation concerning the solution composition is considered necessary.

At this point, it should be noted that at least certain portions of the system described herein, might readily be adapted to a system utilizing soil, as opposed to a hydroponic system. It is envisioned for example, that the diverging trough or track construction 60, might quite readily be utilized to convey an alignment of individual, spaced-apart potted plants from the first or inlet end of the construction, to the second or discharge end. The plant holders for example, could contain soil, or a growing medium which behaves like soil. The diverging nature of the tracks 196, can very adequately provide for the increased growing space requirements needed for plants potted or supported in a soil environment. The conditions within the separate growth chambers, especially the chamber 16, might easily be adjusted to provide the proper ambient environment for optimum plant growth.

As the plants travel through the chambers 12, 14 and 16, they are exposed to predetermined periods of day and night. The specific ambient conditions can vary quite extensively between daylight and darkness sections of the chamber. During darkness for example, the temperature should usually be lowered for most plants. It has been found, that better results are often obtained with some plants if a $CO_2$ gas is introduced into the chamber during the nighttime hours. Accordingly, appropriate tubes and nozzles are provided for introducing a pressurized $CO_2$ gas into each of the baffles 126 and 162. FIG. 23 schematically illustrates a system for introducing $CO_2$ into the baffles. A small tube or conduit 426 leads into each baffle, and each tube is connected to a manifold 428, which in turn is connected to a supply tank 430. A main valve 432 is provided for shutting off the supply to the manifold, and individual valves 434 are included in each tube 426 for controlling the supply to a specific baffle. Thus, if required, the $CO_2$ gas can readily be introduced into one or more of the baffles, for dispersing into the night compartments of the chambers.

As indicated hereinbefore, the invention has been found to be well suited for producing Bibb lettuce. The operation of the system will accordingly be described in conjunction with the production of such a plant. It has been found that a total growing cycle of 28 days, permits Bibb lettuce to reach desired maturity, and be ready for harvest. Moreover, we have found that alternate periods of 18 hours of daylight, to 6 hours of nighttime, permits the plants to develop and grow properly. It should be realized of course, that the relative lengths of daylight and nighttime hours can vary quite extensively, if desired. The specific temperature and humidity conditions within the chambers can also vary over quite a range, not only for a specific crop of lettuce, but for other types of plants as well.

The first step in the operation typically involves placing the plant holders 56 onto the carrier bars 54, and the growth blocks 58 into the plant holders 56. A typical tray 44 is approximately 3 feet by 6 feet in dimensions; and it has dividers or racks 52 to hold 72 of the carrier bars 54 which are approximately 3 feet long, so that such bars can be placed across the tray in side-by-side relationship, on 1-inch centers. Moreover, the plant holders 56 are spaced on 1-inch centers on the bar 54, as well. Thus, each tray can hold up to 1296 plants. We have preferably staggered the specific placement of the plant holders 56 on the carrier bars 54, so that the plants can be nestled closely together, as illustrated in the left hand portion of FIG. 2. The plant seeds can be introduced into the recesses 66 in the growth blocks 58 just prior to mounting the blocks on the carrier bars, prior to positioning the carrier bars in the trays, or after they have been mounted in the trays. After a tray has been filled with the seeded carrier bars, it is at least partially filled with the nutrient solution, so that it is at least partially filled with the nutrient solution, so that the growth blocks 58 are immersed, or at least partially immersed, in the solution.

It has been found that a period of about two days, during which the growth blocks are subject to continuous florescent light, permits the seeds to germinate. The loaded trays are mounted on the carts 44 which are then placed in the germination portion of the chamber 12, proximate the doorway 22. After two days, each cart is positioned on the cart pusher system 82 within the chamber 12, so that they are aligned along the longitudinal axis of the chamber, in side-by-side relationship. they are then pushed to the opposite end of the chamber. In a typical system, the carts 44 are placed in a line so that their three-foot dimension is in the direction of movement. The pusher system is designed so that it pushes a given cart, six feet per day. Thus, if two carts are added to the line from the germination section each day, two carts must be removed from the opposite end, each day.

As previously described, the pusher system 82 engages the bottom of the carts 44 and exerts a pushing force against the cart or carts, positioned over the frame construction. These carts in turn exert a force against the carts next to them so as to push the carts toward the opposite or discharge end of the chamber. By energizing the motor 102, the eccentric 98 causes the pusher bars 86 to move towards the left, as viewed in FIG. 6, at a prescribed rate. As this relative movement occurs, one set of the lugs 94 on the pusher bars 86 engage one set of pusher plates 80 in the channel members 78, thus imparting relative movement to the carts 70.

For purposes of illustration, the pusher system 82 has been designed and constructed so that the pivot points of the lugs 94 are spaced 12 inches apart. The relative spacing between the pusher plates 80 on the other hand, is nine inches. This construction assures that one of the lugs 94 will engage one of the pusher plates 80, on each forward stroke of the pusher bar 86. As the pusher bars 86 move in the opposite direction, i.e., on the return stroke of the eccentric 98, all the spring loaded lugs 94 will slide beneath the pusher plates. As the pusher bar 86 begins a new forward stroke, one of the lugs will engage a new pusher 80.

As explained before, while in the chamber 12, the growing plants pass through alternate periods of daylight and nighttime, each of a prescribed duration, as viewed more clearly in FIG. 6. It might be noted that the relative daytime and nighttime hours can be controlled by adjusting the length of the cables 124 and 160.

Since high intensity lamps 138 are used, the temperature within the compartments A can be raised relatively high. A temperature ranging from about 75° F. to 85° F. has been found to be satisfactory for daytime hours, although a more general range would be about 65° F. to 90° F. During the night however, the temperature is preferably reduced to a range of about 60° F. to 70° F., although lower or higher ranges can be tolerated. By introducing cooled air into the compartments B through the baffles 126, the temperature can be lowered to the desired level. If desired, a pressurized $CO_2$ gas can also be introduced at the same time through the baffles. If the temperature becomes too high during the daytime hours, appropriate fans might be used for cooling purposes. The humidity within the chamber 12 is normally quite high, and it should preferably range from about 60% to 80%. If increased humidity is desired, or if additional nutrients are desired to remedy a specific deficiency, this can be accomplished by introducing a spray into the chamber through the nozzles 146.

During the time that the plants are in the trays and are being pushed through the chamber 12, the space per plant remains constant. During the early phase of growth, space requirements change slowly. After the plants pass through the chamber 12, it might be desirable to increase the distance between the plants. Thus, after a tray has been in the chamber 12, for 14 days, a two-for-one expansion can be achieved by merely removing every other carrier bar 54 from the tray and placing it in a second tray, at a double spacing. At this point, the number of trays are then doubled, and both trays are introduced into the chamber 14 in side-by-side relationship. It might be pointed out, that if desired, additional spacing could be achieved by removing some of the plant holders 58 on each carrier bar 54 as well, so that an increased space between holders on each bar is also created. In this regard, note FIG. 3. It should also be borne in mind, that the number of days that a particular type of plant remains in a given chamber, is determined by the specific requirements of the plant.

While in the chamber 14, the plants are still retained within the trays 44, and are supplied with a nutrient solution. As such, the plants are once again subjected to alternate periods of daylight and nighttime. As illustrated in FIG. 1, the trays 44 are aligned in double rows, and they are pushed through the chamber by the same type of pusher system 82, as used in chamber 12. Observe that the plants are within chamber 14 for a period of seven additional days. Each day two carts are removed from the chamber 14, i.e., one from each of the double rows. Since the chamber 14 is constructed in substantially the same manner as chamber 12, compartments A and B provide the desired environmental conditions in a similar manner, as set forth in conjunction with chamber 12.

After the trays 44 and carrier bars 54 are discharged from the chamber 14, the carrier bars and plants are immediately introduced into the chamber 16, and more specifically the diverging trough systems 60. After the initial growth phases, the plants grow at a substantially faster rate, and require more space, usually on a daily basis. In order to conserve space and energy requirements, the plants should preferably be moved apart on a gradual and steady basis. The diverging troughs 196 accomplish this objective. As described above, the troughs 196 contain the liquid nutrient, and they guide the carrier bars 54 from the inlet end of the trough to its discharge end.

In a typical construction, the troughs 196 might be spaced apart at 1½ inch centers at their inlet end 198, and at 6½ inch centers at their discharge end 200, so that a fan-shaped array of troughs is obtained. At this point, it might be desirable to space the plant holders on 4 inch centers along the longitudinal axis of the carrier bars 54. Thus, the space per plant would be about 6 square inches at the inlet end 198 and about 26 square inches at the discharge or harvest end 200. The specific length of the troughs 196 depends upon the number of days desired in the final growth stage of the plant, their rate of travel through the system, and the like. Trough lengths of 100 feet or more have been used with excellent results.

The diverging trough system 60 can be constructed so that it includes any number of troughs 196. Preferably, the trough system(s) should be able to accommodate all the carrier bars 54 contained in the trays 44 which are discharged from the chamber 14. We have found that a dual system works exceptionally well. As can be seen in FIG. 1, the available space within the chamber 16 is very well utilized. It should be observed that the two oppositely directed, fan-shaped trough systems occupy a minimum space. In a typical construction, a group of diverging troughs might contain 36 troughs and two of the three foot carrier bars 54 might be fed into each trough, every 12 hours, or a total of four bars per day. The carrier pusher would then push the bars six feet every 12 hours. If the desired growth period is seven days as depicted in FIG. 1, each trough should be 84 feet long, plus an inlet and an outlet section. If the plants are placed at four-inch centers along the carrier bars, the 36 troughs would accommodate 1296 plants per day; or the same number which is contained in one 3 × 6 foot tray 44. Two of the diverging trough systems would then be required to accommodate two trays per day discharged from the initial chamber 12.

The frame construction 270 illustrated in FIG. 11, should be long enough so that the carriage 294 traverses a span of at least six feet. By moving the carriage 294 to its most rearward position, two of the carrier bars 54 can be inserted into each trough 196, in end to end alignment. As the motor 370 is energized, the carriage 294 is caused to move forward so that the block pushers 356 contact the couplers 236 attached to the ends of each carrier bar. As mentioned previously, the motor 370 is normally used for this purpose, however, the motor 372 can also be used if a faster speed is desired, e.g., to position the carriage immediately behind the carrier bars. As the carriage 294 continues its forward movement, the carrier bars 54, and attached plants traverse the distance between the ends of the trough. When the carriage 294 reaches the front of the frame 270, the motor 372 is energized, the clutch 380 disengages the motor 370, and the carriage is returned to its starting position. Since the motor 372 operates at a higher rpm, the carriage 294 travels in the reverse direction at a much faster rate. At this time, two additional carrier bars 54 can be introduced into the troughs. It must be understood however, that once the troughs are completely filled, two of the carrier bars 54 must be removed before additional bars can be introduced.

Since the length of the troughs 196 might be quite substantial, the carrier bars 54 within the troughs might tend to buckle in an upward direction as a pushing force is applied against their ends. By introducing the carrier bars 54 between the ribs 222 and 224, they are effectively prevented from any such buckling.

Generally, the desired environmental conditions maintained within the chamber 16, will be quite similar to that maintained in the chambers 12 and 14. In certain instances, it might be desirable to vary the specific conditions. The temperature differential between daytime and nighttime periods for example, might be varied from chamber to chamber, or even with respect to similar compartments within a given chamber. These conditions are general, and their specifics must be determined by the specific plant being grown.

Before removing the carrier bars 54 from the troughs 196, it might be desirable to spray them with water, in preparation for harvest and holding prior to and during shipment. This can readily be accomplished by introducing a water spray through the last set of nozzles 178 at the discharge end of the troughs.

As the carrier bars 54 pass through the troughs 196, they move in a direction counter to that of the nutrient solution, although it should be realized that if preferred, the solution might flow in the same direction as the carrier bars. The solution is introduced into the troughs 196 through the conduits 400 at a prescribed flow rate. Since the troughs are sloped so that their first end is lower than the second end, the solution flows toward such first end. If preferred of course, the first end might be elevated with respect to the second end so that the solution is caused to flow from the first toward the second end of the trough. The level maintained within the troughs should be high enough so that all the plants in the trough are at least partially immersed in the solution. By adjusting the relative height of the weir 232, the liquid level within the trough can be to some extent, increased or decreased.

When the carrier bars 54 reach the discharge end 200 of the trough 196, they slide onto the loading ramps 410, which elevates them out of the trough onto the storage rack 422. The storage rack might be mounted on a freely movable cart, or if preferred, the bars might be allowed to collect on a rack after which they must be removed manually.

While the invention has been described in conjunction with the production of Bibb lettuce, other varieties of lettuce such as leaf lettuce, Buttercrunch lettuce, and Boston lettuce, have also been produced satisfactorily. Moreover, the invention constitutes a production facility which is capable of growing numerous other types of plants, including a variety of vegetables such as celery, tomatoes, and the like. Ornamental floriculture products, such as flowers, pot plants, and green foliage, are also within the scope of plant-types which might be successfully produced.

In the above description and attached drawings, a disclosure of the principles of the invention is presented, together with some of the specific embodiments by which the invention might be carried out.

The embodiments of this invention in which an exclusive property or privilege is claimed are defined as follows:

1. Apparatus for growing plants comprising an elongated housing having at least one chamber therein, said chamber having first and second ends, a plurality of elongated track means having an inlet end and a discharge end, means for mounting said track means within said chamber so that they extend generally longitudinally therein, said track means being arranged relative to each other so that they diverge outwardly so as to form a fan-shaped array of pathways extending from one end of the chamber to the other end, the discharge ends of said track means being spaced apart a greater distance than the inler ends, means for holding said plants in a prescribed manner so that they can be introduced into the inlet end of the track means, and means for moving said plants from said inlet end of said track means to the discharge end at a prescribed speed.

2. The combination of claim 1 wherein said track means are formed as troughs, the means for holding said plants includes a plurality of elongated carrier bars, said bars being slidably mounted within said troughs, and means associated with said carrier bars for holding said plants.

3. The combination of claim 2 in which said plant holding means includes a plurality of clip members removably attached to the carrier bars, and a plurality of growth blocks, said growth blocks being held by said clips in spaced-apart relationship on said carrier bars, each growth block adapted to retain a plant seed and the resulting plant during its growth cycle and serving as a supporting means for said plant during its growth cycle.

4. The combination of claim 3 in which the growth block is formed of a material which is capable of absorbing a fluid medium.

5. The combination of claim 2 wherein each trough is capable of holding a fluid medium, means for introducing said fluid medium into said trough proximate one of its ends, means approximate its other end for discharging said fluid medium therefrom, and means for maintaining the level of said fluid medium within said trough at a prescribed level so that the plants are at least partially immersed in the fluid medium.

6. The combination of claim 5 in which the fluid medium includes water and at least one nutrient for feeding the plants.

7. The combination of claim 5 in which the discharge end of the troughs is elevated relative to the inlet end, and the means for introducing said fluid medium is positioned proximate said discharge end.

8. The combination of claim 5 in which the inlet end of the troughs is elevated relative to the discharge end, and the means for introducing said fluid medium is positioned proximate said inlet ends.

9. The combination of claim 5 wherein the means for maintaining the level of said fluid medium within the trough includes a vertically adjustable weir proximate the fluid discharge end of the trough.

10. The combination of claim 2 wherein a substantially horizontally aligned channel member is formed in the side wall of each trough, said channel members being positioned above the bottom surface of the trough and extending along the longitudinal axis of said trough, and means are provided for slidably mounting the carrier bars within said channels.

11. The combination of claim 10 in which said channels are formed by a pair of spaced-apart ribs, and the means for slidably mounting the carrier bars includes a couplar attached to each end of said bar, said coupler being adapted to slide between said ribs.

12. The combination of claim 11 wherein a portion of the upper rib proximate each end of the trough is removed so as to permit the carrier bars to be introduced and removed from the troughs.

13. The combination of claim 10 in which a separator is provided, means for positioning said separator within the trough so that it is interposed between the carrier bars and the bottom surface of the trough, said divider extending along the longitudinal axis of said trough and being provided with a plurality of spaced-apart openings along its length.

14. The combination of claim 2 wherein the means for moving said plants within said troughs includes a pusher mechanism, means for movably mounting said pusher mechanism proximate the inlet end of the troughs, said pusher mechanism including carriage means for engaging an end of the carrier bars slidably mounted within the troughs, and means for imparting movement to said carriage means whereby a pushing force is exerted against the carrier bars so that they are moved toward the discharge end of the trough.

15. The combination of claim 14 wherein the pusher mechanism includes a carriage housing which extends transverse to the length of the troughs, a plurality of pusher carriages mounted within said carriage housing, one of said pusher carriages positioned for relative movement with respect to each trough.

16. The combination of claim 15 wherein the mounting means for the pusher mechanism includes a frame construction having sides substantially parallel to the troughs, the length of said sides being greater than the length of the carrier bar, a guide rail secured to each side, and means including at least one roller on each side for mounting the carriage housing above said troughs on said guide rails.

17. The combination of claim 15 wherein an elongated shaft is provided within said carriage housing which extends along the longitudinal axis of said housing, means for mounting said pusher carriage on said shaft for relative movement along said shaft axis, a pusher bracket pivotally connected to each pusher carriage, a plurality of block pushers, and means for attaching a block pusher bracket, the block pushers being positioned within the trough and adapted to exert a pushing force against the end of the carrier bar.

18. The combination of claim 17 wherein a plurality of guide means are provided, means for attaching one of said guide means to each pusher carriage so that the guide means projects into a trough, said rollers adapted to guide the pusher carriages in a lateral direction as said pusher carriages move along the longitudinal axis of said diverging troughs.

19. The combination of claim 17 wherein a cam is provided, means for securing said cam to the forward edge of the carriage housing, a cam follower rotatably mounted on each pusher carriage, said cam and cam followers preventing the pusher carriages from pivoting about the axis of said elongated shaft as a pushing force is exerted against the carrier bars.

20. The combination of claim 16 wherein the means for imparting movement to said carriage means includes a first motor mounted on said frame construction for driving said carriage means toward the discharge end of the troughs at a prescribed speed, and a second motor for driving said carriage means in the reverse direction at a prescribed speed which is faster than the first speed.

21. A system for growing plants hydroponically under controlled environmental conditions comprising at least one elongated chamber having an inlet end and a discharge end, means including a diverging trough system for holding said plants in a prescribed manner within said chamber so that they can be moved from said inlet end to said discharge end at a prescribed speed, means for moving said plants through said chamber, means for maintaining said plants in a fluid medium as they are moved from one end of the chamber to the other, means within said chamber for dividing it into multiple compartments of alternate periods of lightness and darkness, each such period being of a prescribed duration, light means for providing a predetermined level of illumination in said chamber during the periods of lightness, said divider means effectively preventing the light from being directed into the darkness compartments of the chamber, said diverging trough system guiding said plants through the alternate compartments of lightness and darkness, said trough system capable of holding said fluid medium whereby the plants are at least partially immersed in said fluid medium, means for controlling the temperature within said compartments, and means for controlling the humidity within said compartments.

22. The combination of claim 21 wherein said plants are grown within said chamber without the use of natural sunlight, and means are provided within the illuminated compartments for introducing a spray of fluid medium into said compartments.

23. The combination of claim 21 wherein means are provided within the darkened compartments for introducing cooled air thereinto.

24. The combination of claim 23 wherein said means includes a tubular baffle having apertures therein, and means for positioning one of said baffles within at least some of said darkened compartments, by suspending said baffle from the top of said compartment.

25. The combination of claim 21 wherein means are provided for introducing a pressurized $CO_2$ gas into the chamber.

26. A system for growing plants hydroponically under controlled environmental conditions comprising at least two elongated chambers, each chamber having an inlet end and a discharge end, means for holding said plants in a prescribed manner within each chamber so that they can be moved from said inlet end to said discharge end at a prescribed speed, means for moving said plants through each chamber, means for maintaining said plants in a fluid medium as they are moved from one end of the chamber to the other, means within each chamber for dividing it into compartments of alternate periods of lightness and darkness, each such period being of a prescribed duration, light means for providing a predetermined level of illumination in said chamber during the periods of lightness, said divider means effectively preventing the light from being directed into the darkness compartments of the chamber, the means for holding said plants in at least one of said chamber, the means for holding said plants in at least one of said chambers including a diverging trough system therein for holding said plants in a prescribed manner and guiding said plants through the alternate compartments of lightness and darkness, said diverging trough system capable of holding said fluid medium whereby the plants are at least partially immersed in said fluid medium, the length of said trough system covering the major portion of said chamber, said trough system including a plurality of troughs mounted in side-by-side relationship, the discharge end of said troughs diverging outwardly, means for controlling the temperature within said compartments, and means for controlling the humidity within said compartments.

27. The combination of claim 26 wherein the other chamber includes a plurality of trays for holding said plants in a prescribed manner, means for moving said trays through said chamber, said trays being capable of holding said fluid medium whereby the plants are at least partially immersed in said fluid medium, the means for holding the plants in a prescribed manner includes a plurality of elongated carrier bars, said carrier bars adapted to be maintained within said trays in a prescribed manner, and being capable of being slidably mounted within the diverging trough system in end-to-end relationship, and means for removably attaching said plants to said carrier bars.

28. The combination of claim 27 wherein the means for moving said plants through said chamber includes a pusher mechanism, means for mounting said pusher mechanism proximate the inlet end of said trough system, said pusher mechanism including means for simultaneously exerting a pushing force against all the carrier bars slidably mounted within the troughs.

29. A system for growing plants hydroponically under controlled environmental conditions comprising at least two elongated chambers, each chamber having an inlet end and a discharge end, means including a diverging trough system in at least one of the chambers for holding said plants in a prescribed manner within said chamber so that they can be moved from said inlet end to said discharge end at a prescribed speed, means for moving said plants through said chamber, means for maintaining said plants in a fluid medium as they are moved from one end of the chamber to the other, means within said chamber for dividing it into multiple compartments of alternate periods of lightness and darkness, each such period being of a prescribed duration, light means for providing a predetermined level of artificial illumination in said chamber during the periods of lightness, said divider means effectively preventing the light from being directed into the darkness compartments of the chamber, said diverging trough system guiding said plants through the alternate compartments of lightness and darkness, said trough system capable of holding said fluid medium whereby the plants are at least partially immersed in said fluid medium, means for controlling the temperature within said compartments, and means for controlling the humidity within said compartments.

30. The combination of claim 29 wherein the other compartment includes a plurality of trays for holding said plants in a prescribed manner, means for moving said trays through said chamber, said trays being capable of holding said fluid medium whereby the plants are at least partially immersed in said fluid medium.

* * * * *

UNITED STATES PATENT AND TRADEMARK OFFICE
CERTIFICATE OF CORRECTION

PATENT NO. : 4,028,847
DATED : June 14, 1977
INVENTOR(S) : Noel Davis, William M. Dreier and Stanley C. Rustad It is certified that error appears in the above-identified patent and that said Letters Patent are hereby corrected as shown below:

Col. 2, line 6; "netral" should read --- neutral ---.
Col. 5, line 65; "theralong" should read --- therealong ---.
Col. 6, line 38; "surface of" should read --- surface 50 of ---, Col. 7, line 24; "appreciable" should read --- appreciably ---,
       line 57; "shownin" should read --- shown in ---.
Col. 8, line 40; "14-14" should read --- 11-14 ---.
Col. 9, line 24; "THe" should read --- The ---,
       line 60: "275" should read --- 274 ---.
Col. 10, line 33; "280" should read --- 270 ---,
         line 62; "348 to" should read --- 348 and appropriate bolts. The bearing 346 permits the carriage 340 to ---.
Col. 11, line 6; "adapted specifically," should read --- adapted to exert a pushing force against the carrier bar 54, and more specifically, ---
         line 37; "THe" should read --- The ---,
         line 56; "motor rotates" should read --- motor which rotates ---.
Col. 13, line 50; please remove the phrase "from being discharged".
         line 62; "remaining the" should read --- remaining in the ---.
Col 14, line 24, "time." should read --- time, ---,
        line 53; "adequatly" should read --- adequately ---.
Col. 15, lines 48-50; please remove the phrase "so that it is at least partially filled with the nutrient solution,",
         line 61; "they" should read --- They ---.
Col. 16, line 25; "pusher 80" should read --- pusher plate 80 ---.
Col. 19, line 12; "lettuce, Buttercrunch" should read --- lettuce, red leaf lettuce, Buttercrunch ---,
         line 39; "inler" should read --- inlet ---.
Col. 20, line 28; "couplar" should read --- coupler ---.

UNITED STATES PATENT AND TRADEMARK OFFICE
CERTIFICATE OF CORRECTION

PATENT NO. : 4,028,847

DATED : June 14, 1977

Page 2 of 2

INVENTOR(S) : Noel Davis, William M. Dreier, Stanley C. Rustad

It is certified that error appears in the above-identified patent and that said Letters Patent are hereby corrected as shown below:

Col. 21, line 4; "pusher bracket" should read --- pusher to each pusher bracket ---,
line 59; "of fluid" should read --- of a fluid ---.

Col. 22, lines 22-23; please remove the phrase "the means for holding said plants in at least one of said chambers".

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*